United States Patent
Nebel et al.

(10) Patent No.: US 11,889,786 B2
(45) Date of Patent: Feb. 6, 2024

(54) MOWER WITH MANUAL LIFTING MECHANISM FOR WING DECK

(71) Applicant: Excel Industries, Inc., Hesston, KS (US)

(72) Inventors: Brian L. Nebel, Hesston, KS (US); Thomas J. Gaeddert, Hesston, KS (US); Philip Lowell Hochstetler, Goshen, IN (US)

(73) Assignee: Excel Industries, Inc., Hesston, KS (US)

(*) Notice: Subject to any disclaimer, the term of this patent is extended or adjusted under 35 U.S.C. 154(b) by 589 days.

(21) Appl. No.: 17/015,507

(22) Filed: Sep. 9, 2020

(65) Prior Publication Data

US 2022/0071087 A1  Mar. 10, 2022

(51) Int. Cl.
| | | |
|---|---|---|
| A01D 34/81 | (2006.01) | |
| A01D 34/66 | (2006.01) | |
| A01B 73/04 | (2006.01) | |
| A01D 101/00 | (2006.01) | |
| A01D 75/30 | (2006.01) | |
| A01D 34/82 | (2006.01) | |
| A01D 34/64 | (2006.01) | |

(52) U.S. Cl.
CPC ............ *A01D 34/81* (2013.01); *A01B 73/044* (2013.01); *A01D 34/66* (2013.01); *A01D 34/824* (2013.01); *A01D 75/306* (2013.01); *A01D 2034/645* (2013.01); *A01D 2101/00* (2013.01)

(58) Field of Classification Search
CPC ...... A01D 34/81; A01D 34/66; A01D 34/824; A01D 75/306; A01D 2034/645; A01B 73/044
See application file for complete search history.

(56) References Cited

U.S. PATENT DOCUMENTS

| | | | | |
|---|---|---|---|---|
| 3,243,837 A * | 4/1966 | Smith | ............... | E05B 5/003 74/41 |
| 5,428,868 A * | 7/1995 | Safdeye | ............... | A45C 13/262 16/113.1 |
| 5,690,217 A * | 11/1997 | Friday | ............... | D06F 95/002 220/532 |
| 6,308,503 B1 * | 10/2001 | Scag | ............... | A01D 34/685 56/16.9 |
| 10,051,786 B2 * | 8/2018 | Mullet | ............... | A01D 34/66 |
| 2007/0101693 A1 * | 5/2007 | Korthals | ............... | A01D 34/66 56/320.1 |
| 2009/0159385 A1 * | 6/2009 | Poissant | ............... | A47C 13/00 190/110 |
| 2010/0212278 A1 * | 8/2010 | Latuszek | ............... | A01D 34/661 56/320.1 |

(Continued)

*Primary Examiner* — Thomas B Will
*Assistant Examiner* — Julia C Tran
(74) *Attorney, Agent, or Firm* — Shook, Hardy & Bacon L.L.P.

(57) ABSTRACT

A mower with one or more wing decks that includes one or more manual lifting mechanisms for the one or more wing decks. The manual lifting mechanism may shift between retracted and extended positions, where in the extended position a handle can be positioned further away from the wing deck. When the handle is in the extended position, a user can manually engage the handle and lift the wing deck from a lowered configuration to a raised configuration, using less force than would be required if the handle was in the retracted configuration.

20 Claims, 17 Drawing Sheets

(56) References Cited

U.S. PATENT DOCUMENTS

2016/0106020 A1* 4/2016 Akahane .............. A01D 34/66
                                                  56/17.1
2021/0059116 A1* 3/2021 Laurin ................ A01D 34/661

* cited by examiner

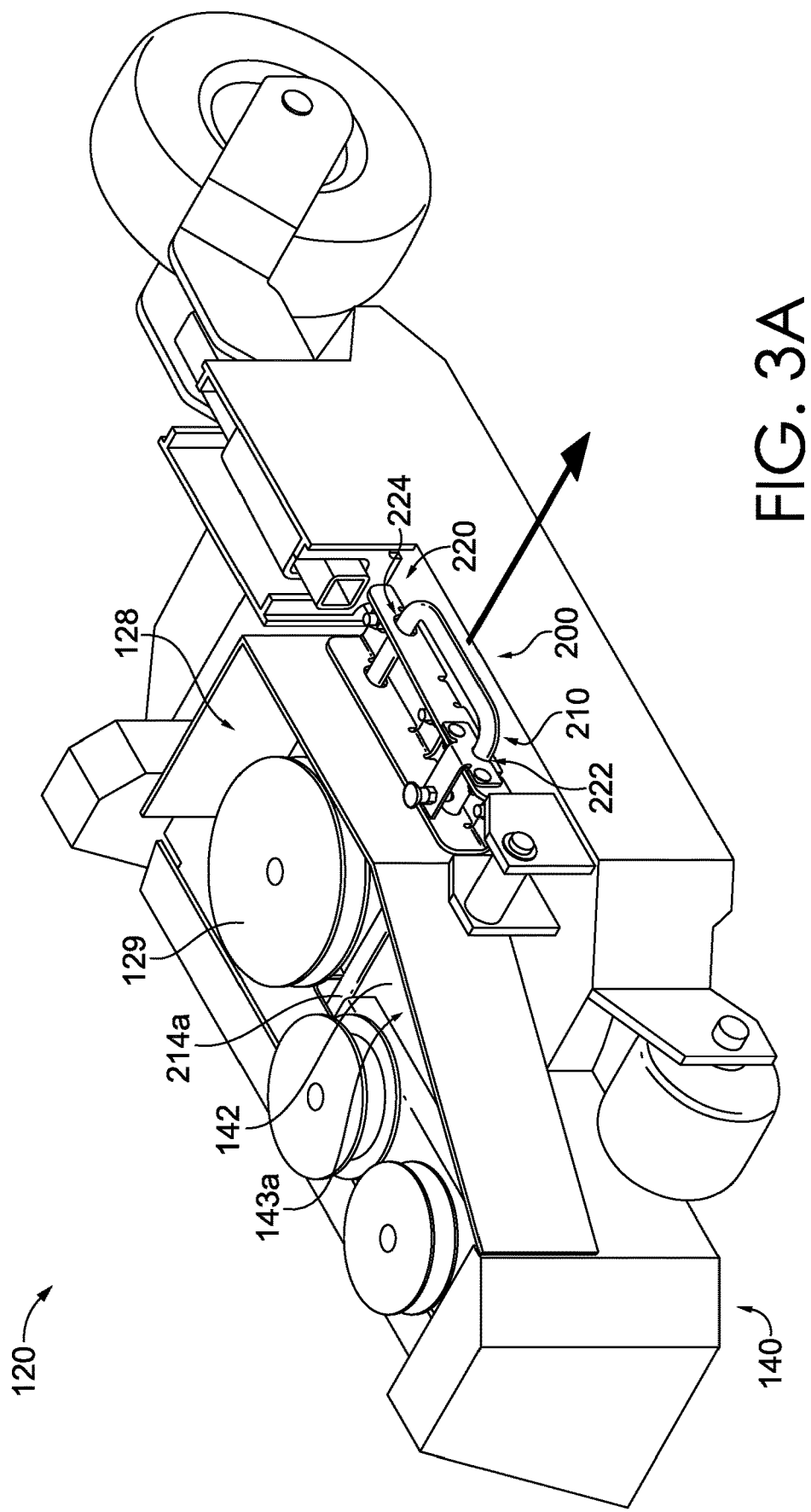

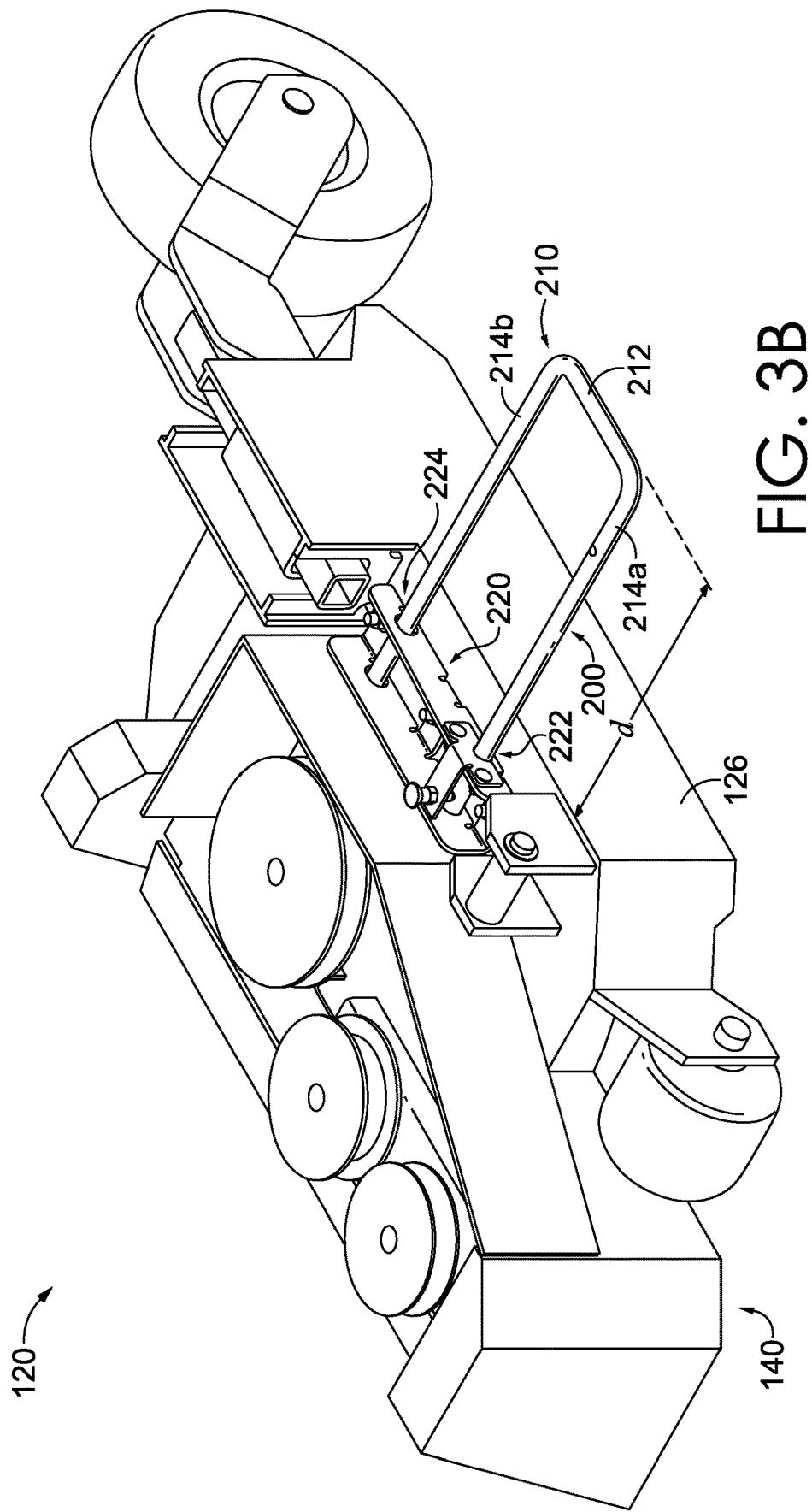

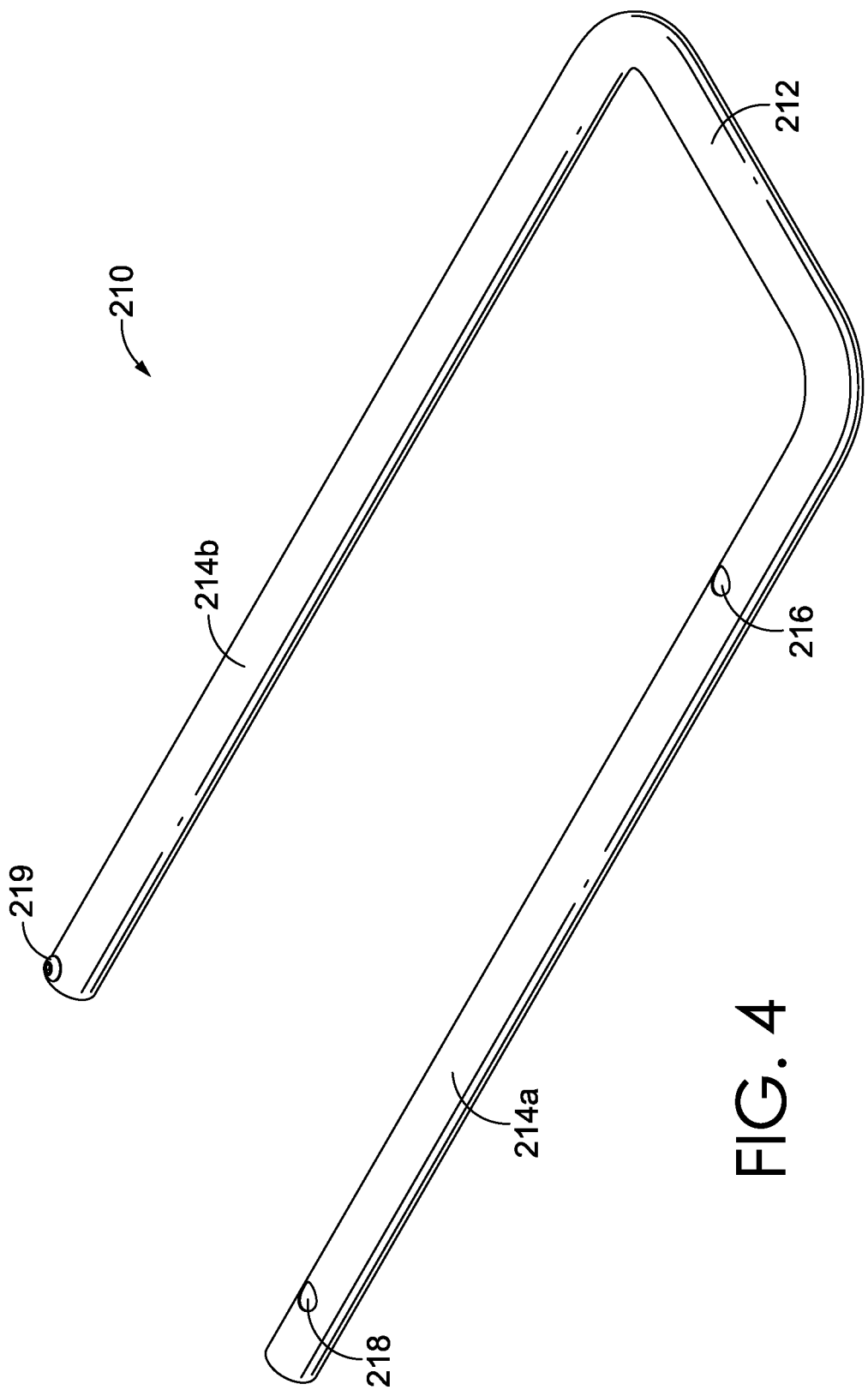

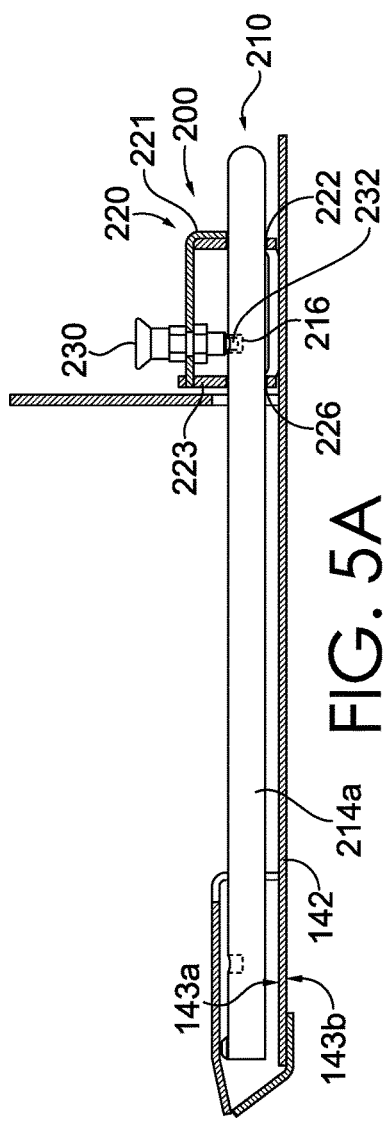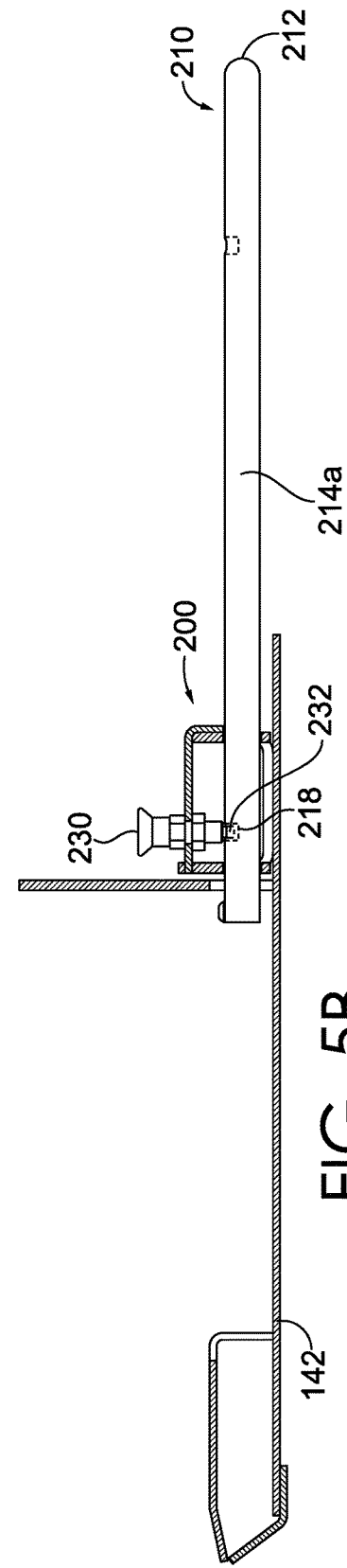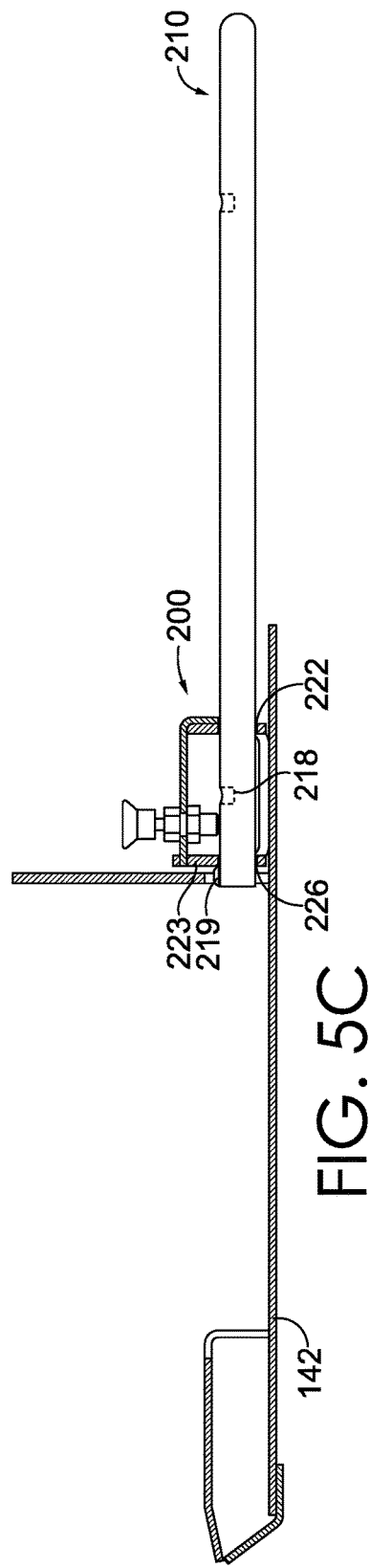

MOWER WITH MANUAL LIFTING MECHANISM FOR WING DECK

FIELD

Aspects provided relate to a mower with a wing deck. More particularly, aspects herein relate to a mower with a manual lifting mechanism for a wing deck.

BACKGROUND

Conventional mowers having one or more wing decks may be designed such that the wing decks can be lifted up, e.g., in order to reduce the ground footprint for compact storage and/or to navigate a smaller space or opening. Certain conventional wing-deck mowers may include a linear actuator to lift the wing deck; however, such a mechanism is conventionally employed on larger wing-deck mowers where there is the adequate space for such a lifting mechanism. While such linear actuator mechanisms may be employed on smaller wing-deck mowers, complicated linkages or other modifications may be required resulting in a resource intensive manufacturing process. Certain machine-free lifting mechanisms may be employed to aid in lifting one or more wing decks, such as a static grip fixedly attached to the wing deck to facilitate manual lifting. However, such a fixed, static grip provides limited reduction in lifting force because of their fixed configuration.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 3A depicts a top and side perspective view of one wing deck, with the top of pulley chamber removed, revealing a portion of a manual lifting mechanism positioned adjacent a pulley, and with the manual lifting mechanism in a retracted position, in accordance with aspects hereof;

FIG. 3B depicts a top and side perspective view of the wing deck of FIG. 3A, with the manual lifting mechanism in an extended position, in accordance with aspects hereof;

FIG. 4 depicts a top and side perspective view of a shifting member, particularly showing one example handle and at least one shaft extended out from the handle, in accordance with aspects hereof;

FIG. 5A depicts a side view of a lifting mechanism and a portion of a wing deck, revealing the locking mechanism, a cross-section of the lifting engagement member, and the shifting member in a retracted position, in accordance with aspects hereof;

FIG. 5B depicts a side view of a lifting mechanism and a portion of a wing deck, revealing the locking mechanism, a cross-section of the lifting engagement member, and the shifting member in an extended position, in accordance with aspects hereof;

FIG. 5C depicts a side view of a lifting mechanism and a portion of a wing deck, revealing the locking mechanism, a cross-section of the lifting engagement member, and a positive stop member on the shaft of the shifting member engaging a portion of the lifting engagement member, in accordance with aspects hereof;

DETAILED DESCRIPTION

Figure 1A:
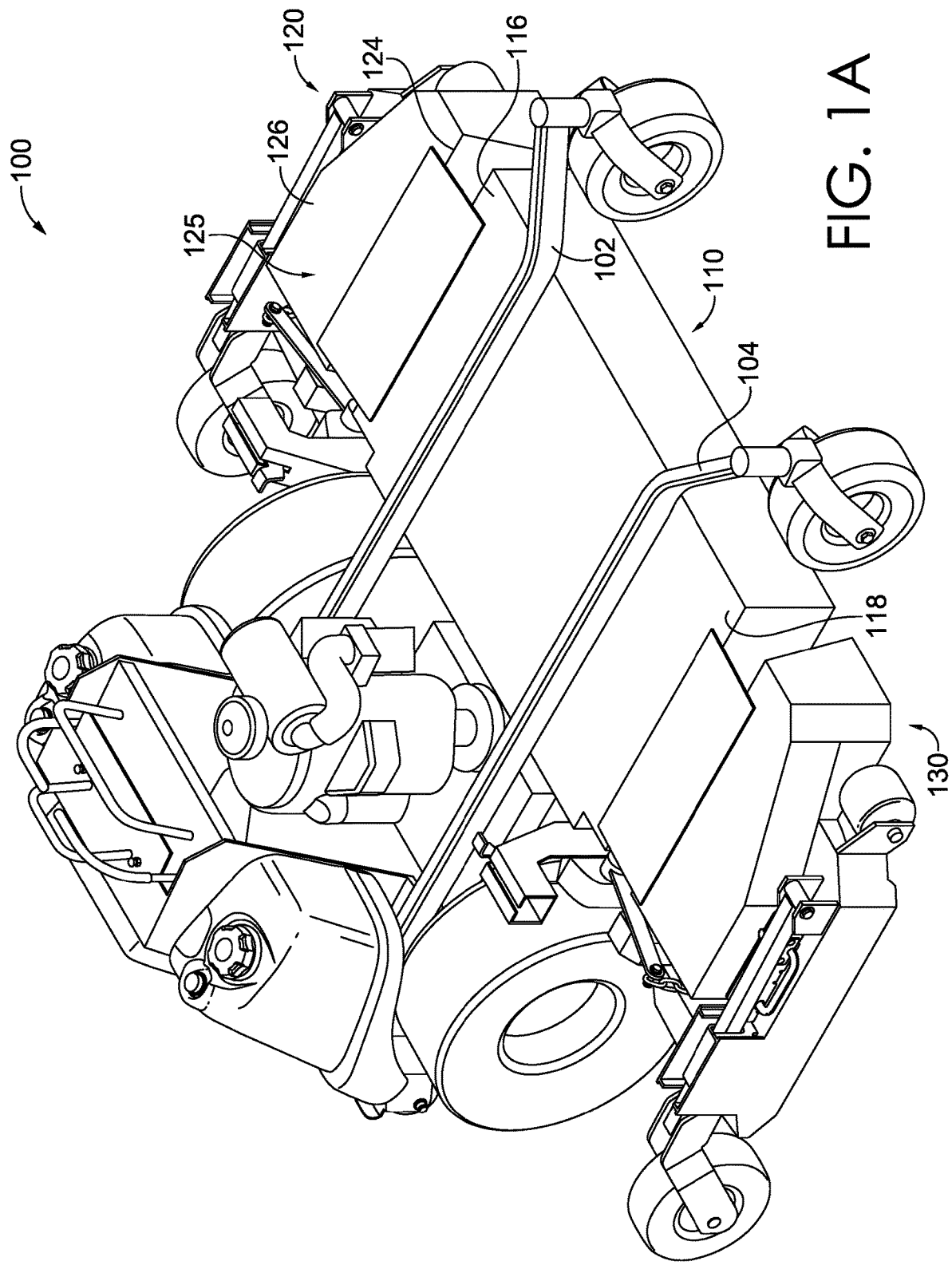
FIG. 1A depicts a top and side perspective view of a mower with a wing deck on each side, with the wing decks in a lowered configuration, in accordance with aspects hereof.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein and may have various components hidden to aid in the written description thereof.

Aspects herein describe a mower with one or more wing decks that includes one or more manual lifting mechanisms for the wing decks. In one aspect, each wing deck of the mower can include a manual lifting mechanism. In various aspects, the manual lifting mechanism can shift between retracted and extended positions, where in the extended position, a handle of the manual lifting mechanism is positioned further away from the wing deck relative to when in the retracted position. In aspects, in the extended position, a user can engage the handle and lift the wing deck from a lowered configuration to a raised configuration, using less force than would be required if the handle was in the retracted position. When in the retracted position, the manual lifting mechanism is maintained substantially within a footprint (e.g., width) of the mower, in an example.

As discussed above, certain conventional wing-deck mowers may rely on a machine-based lifting mechanism for lifting up the wing deck. However, such machine-based mechanisms may be resource intensive to manufacture and/or may require complex configurations for use on smaller wing-deck mowers. Further, while other certain conventional wing-deck mowers may utilize a static grip fixedly attached to the wing deck to facilitate manual lifting, such a fixed, static grip does not adjustably reduce a force required to lift the wing deck when lifting the wing deck while limiting physical interference between the mower and the environment while in a non-lifting operation (e.g., mowing).

The mowers and manual lifting mechanisms disclosed herein can alleviate one or more of the above-described problems. For instance, in various aspects, the mower with one or more wing decks can include a manual lifting mechanism that can shift from a retracted position to an extended position, where in the extended position the wing deck can be manually lifted into a raised configuration using less force than that required when the manual lifting mechanism is in the retracted position. As discussed further below, in such aspects, the manual lifting mechanisms disclosed herein can provide an efficient and effective lifting mechanism for a single user to shift the wing deck between a lowered configuration and a raised configuration.

Accordingly, in one aspect a mower with one or more wing decks is provided. The mower can include at least one frame member and a main deck coupled to the at least one frame member. The main deck may have a main deck first side and a main deck second side opposite the main deck first side, where the main deck includes at least one main deck blade. The mower can further include a first wing deck. The first wing deck can have a first wing deck first side and a first wing deck second side opposite the first wing deck first side, where the first wing deck includes at least one first wing deck blade. At least a portion of the first wing deck shifts between a lowered configuration, where the first wing deck and the main deck are positioned in a substantially planar orientation for engaging a mowing surface, and a raised configuration, where the first wing deck second side has shifted up so that the first wing deck extends between the first wing deck first side and the first wing deck second side in a direction that is transverse to a direction of extension between the main deck first side and the main deck second side. The mower further includes a manual lifting mechanism coupled to the first wing deck. The manual lifting mechanism can include a handle portion and at least one shaft extending out from the handle portion. The manual lifting mechanism can be shiftable between a retracted position and an extended position, where, when in the extended position, at least part of the handle portion is positioned further away from the wing deck second side than when in the retracted position. As used herein, the term "shiftable" includes a variety of movements, including sliding, translating, rotating, moving, shifting, and the like.

In another aspect, a stand-on mower with one or more wing decks is provided. The stand-on mower can include at least one frame member; and an operator platform coupled to the at least one frame member. The stand-on mower can further include a main deck coupled to the at least one frame member. The main deck can have a main deck first side and a main deck second side opposite the main deck first side. The main deck can also include at least one main deck blade. The stand-on mower can further include a wing deck that has a wing deck first side and a wing deck second side opposite the wing deck first side. The wing deck can include at least one wing deck blade. At least a portion of the wing deck can shift between a lowered configuration, where the wing deck and the main deck are positioned in a substantially planar orientation for engaging a mowing surface, and a raised configuration, where the wing deck second side has shifted up with respect to the main deck such that the wing deck is positioned transverse to the orientation of the main deck. The stand-on mower can also include a manual lifting mechanism coupled to the wing deck. The manual lifting mechanism can include a handle portion and at least one shaft extending out from the handle portion. The manual lifting mechanism can be shiftable between a retracted position and an extended position, where, when in the extended position, the handle portion is positioned further away from the wing deck second side than when in the retracted position.

As used herein, the term "about" means plus or minus 10% of the numerical value of the number with which it is being used unless otherwise indicated or custom in the art dictates otherwise. Therefore, for example, "about 10 inches" includes the value 10 inches in addition to the range of 9 inches to 11 inches.

Figure 2A:
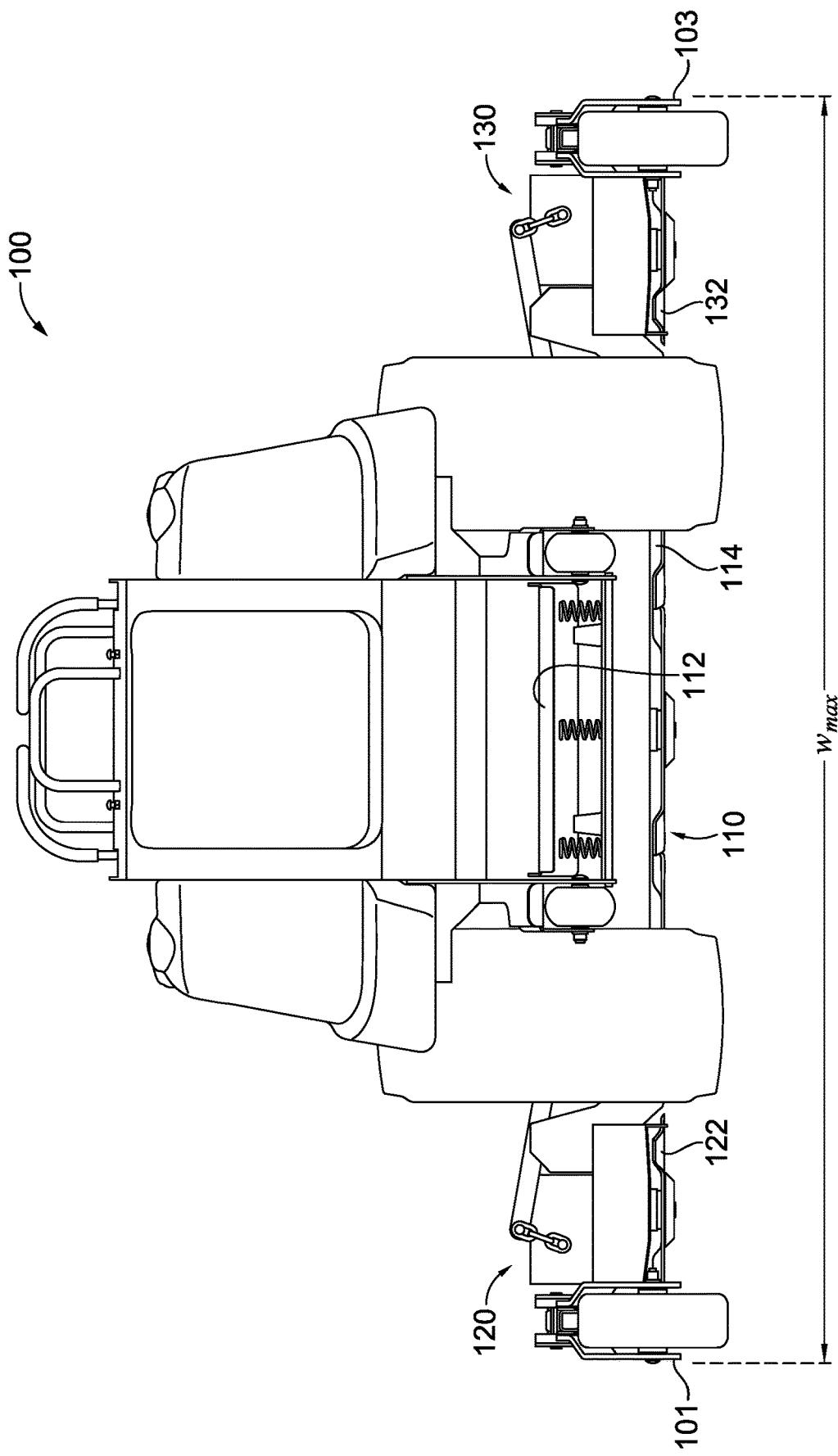
FIG. 2A depicts a rear view of the mower of FIG. 1A, in accordance with aspects hereof.

Turning now to the figures, and FIGS. 1A and 2A in particular, a mower 100 is depicted. As best seen in FIG. 1A, the mower 100 includes frame members 102 and 104, a main deck 110, a first wing deck 120, and a second wing deck 130. As depicted in FIG. 2A, the mower 100 can also include a stand-on operator platform 112, in aspects. It should be understood that, while a stand-on mower is depicted in FIGS. 1A and 2A, other types of mowers having one or more wing decks are also contemplated for use with the features disclosed herein, such as a walk-behind mower, a zero-turn or riding mower, or a tow-behind mower.

In the aspect depicted in FIGS. 1A and 2A, the first wing deck 120 and the second wing deck 130 are both positioned in a lowered configuration. In aspects, the lowered configuration can include the first wing deck 120 and the main deck 110 positioned in a substantially planar orientation for engaging a mowing surface. In the same or alternative aspects, the lowered configuration can include the first wing deck 120, the second wing deck 130, and the main deck 110 positioned in a substantially planar orientation for engaging a mowing surface. It is contemplated that a wing deck may deviate from a substantially planar orientation during mowing operation to conform with or follow the grade of the terrain being mowed. However, when the ground surface on which the main deck and a wing deck are positioned is planar, the main deck and the wing deck are in a substantially planar orientation when the wing deck is in a lowered configuration.

In aspects, the maximum width $w_{max}$ of the mower 100 in the lowered configuration, from a first side 101 to a second side 103, as depicted in FIG. 2A, can be from about 60 inches to about 130 inches, or about 70 inches to about 110 inches, or about 90 inches.

In various aspects, each of the main deck 110, the first wing deck 120, and the second wing deck 130 can include one or more blades. In such aspects, the first wing deck 120 and the second wing deck 130 extend the overall cutting width of the mower 100. In various aspects, one or more of the blades of the main deck 110, the first wing deck 120, and the second wing deck 130, or a combination thereof, may be coupled to one or more spindles or pulleys engageable by a belt for rotating the blades. Alternatively, the one or more blades may be direct driven by electric motors or hydraulic motors. As can be seen in the aspect depicted in FIG. 2A, the main deck 110 includes at least one main deck blade 114, the first wing deck 120 includes at least one first wing deck blade 122, and the second wing deck 130 includes at least one second wing deck blade 132.

As can be seen in FIG. 1A, the main deck 110 can be coupled to one or more of the frame members 102 and 104 directly or indirectly using any convenient coupling mechanisms (e.g., straps, chains, bolts, welds, linkages). The frame may include additional members, such as cross members between the frame members 102 and 104, in an example. In aspects, the first wing deck 120 can be coupled to the main deck 110. For example, as can be seen in the aspect depicted in FIG. 1A, a first wing deck first side 124 can be coupled to a main deck first side 116. In various aspects, the first wing deck 120 can be shiftably coupled to the main deck 110 such that the first wing deck 120 shifts from the lowered position depicted in FIGS. 1A and 2A to the raised positioned depicted in FIGS. 1B and 2B, discussed further below. The first wing deck 120 can be shiftably coupled to the main deck 110 using any convenient mechanisms. In one aspect, the first wing deck 120 can be shiftably coupled to the main deck 110 via one or more pivot mechanisms, such that the first wing deck 120 can rotate about one or more pivot points when shifting to the raised configuration. Various aspects of pivot mechanisms that may couple the first wing deck 120 to the main deck 110 are discussed further below with reference to FIGS. 7A-7C.

While certain features may be discussed with respect to the first wing deck 120 of the mower 100, it should be understand that, in aspects, the same features may also apply for the second wing deck 130 of the mower 100.

Figure 1B:
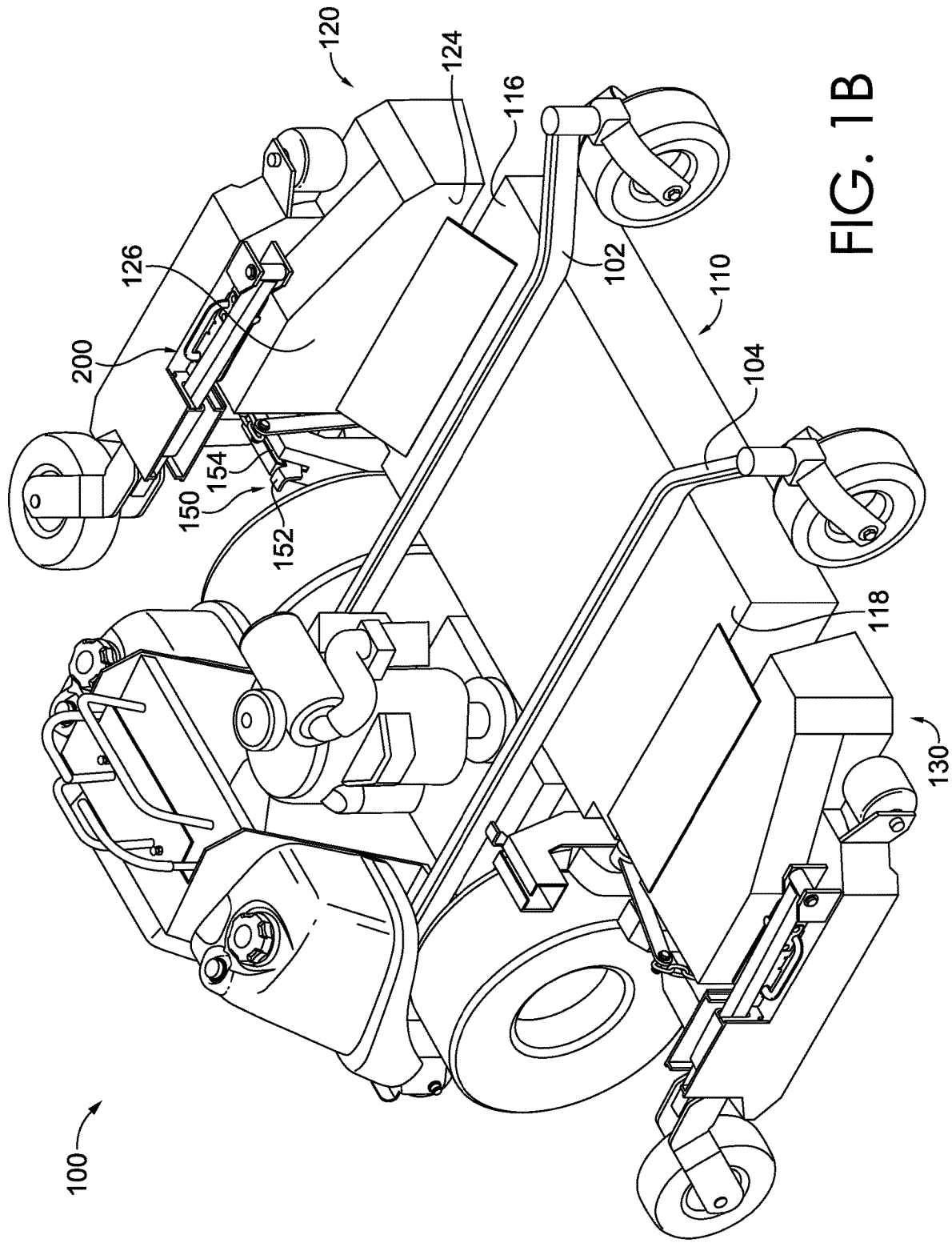
FIG. 1B depicts a top and side perspective view of the mower of FIG. 1A with one of the wing decks in the lowered configuration and one of the wing decks in a raised configuration, in accordance with aspects hereof.
Figure 2B:
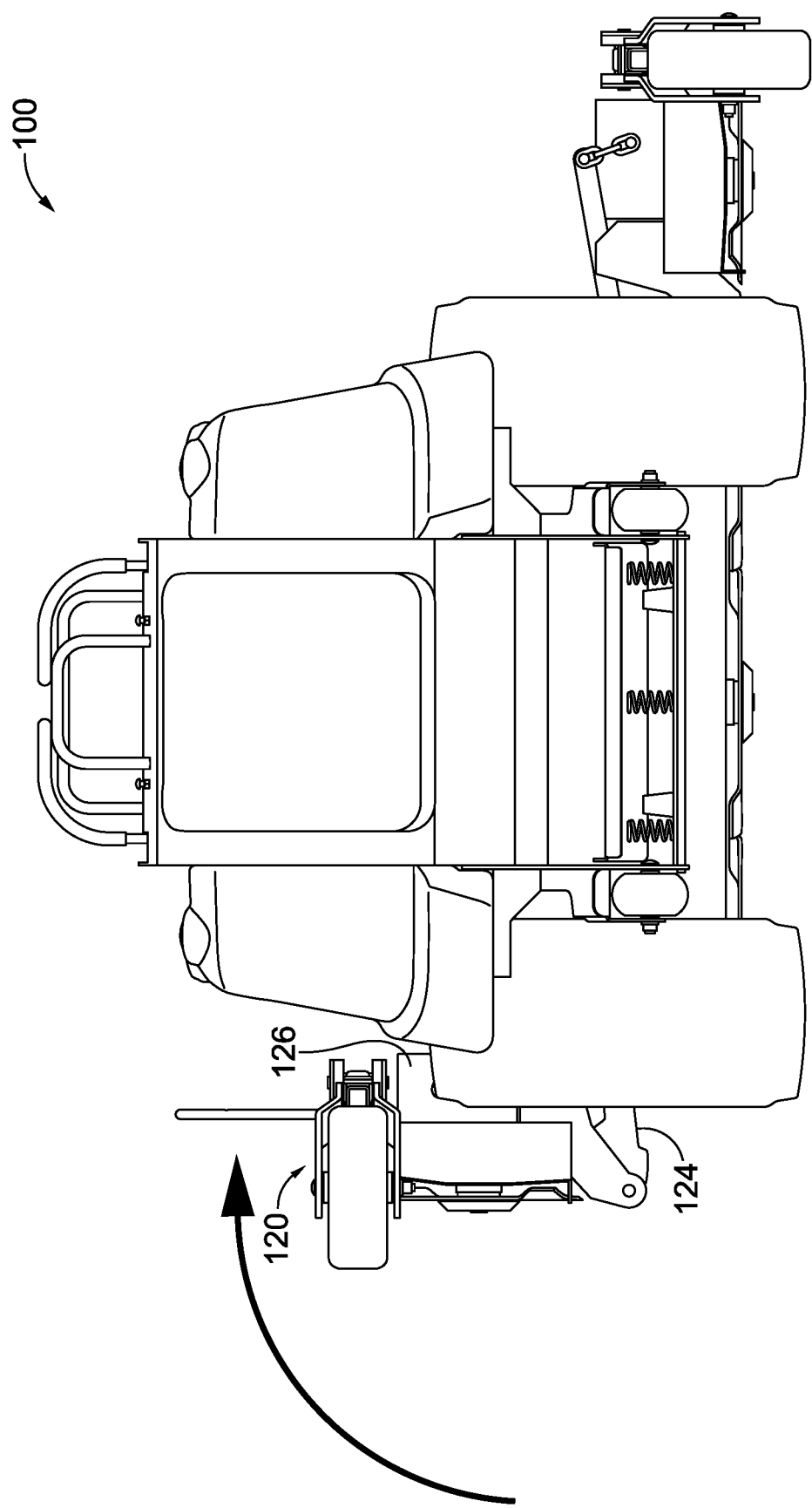
FIG. 2B depicts a rear view of the mower of FIG. 1B, in accordance with aspects hereof.

FIGS. 1B and 2B depict the mower 100 with the first wing deck 120 in a raised configuration. In certain aspects, as discussed above, in the raised configuration, the first wing deck second side 126 has shifted up and towards the main deck 110 so that the first wing deck 120 would no longer be in a position to engage a mowing surface, while the main deck 110 would be positioned to engage the mowing surface. In one aspect, in the raised configuration, the orientation of the first wing deck is positioned transverse to the orientation of the main deck. In the same or alternative aspects, a direction of extension between the first wing deck first side 124 and the first wing deck second side 126 is transverse to a direction of extension between the main deck first side 116 and the main deck second side 118. In one aspect, the direction of extension between the first wing deck first side 124 and the first wing deck second side 126 is oriented at or about a 90° angle with respect to the direction of extension between the main deck first side 116 and the main deck second side 118. A transverse relationship as provided above is from about 45° to about 120°. In another example, a transverse relationship as provided above is from about 60° to about 110°. In yet another example, a transverse relationship as provided above is from about 75° to about 105°.

In certain aspects, as discussed above, when the first wing deck 120 is shifted from the lowered configuration to the raised configuration, the ground footprint of the mower 100 can be reduced. For instance, in one example aspect, when the first wing deck 120 and the second wing deck 130 are in a raised configuration the width of the mower 100 can be about 5 inches to about 30 inches less, about 7 inches to about 25 inches less, or about 10 inches to about 20 inches less than the maximum width $w_{max}$ of the mower 100 when the first wing deck 120 and the second wing deck 130 are in a lowered configuration, as described above with reference to FIG. 2A. The reduction in the width $w_{max}$ by raising one or more wing decks to the raised configuration allows the mower to navigate the working environment, such as passing through limited-width gates, between structures, and the like. Additionally, the reduction in the width $w_{max}$ by raising one or more wing decks to the raised configuration allows for a more compact footprint during storage and/or transportation.

In aspects, it may be desirable to secure the first wing deck 120 to the main deck 110 when in the raised configuration, e.g., when transporting the mower 100. As can be seen in the aspect depicted in FIG. 1B, the mower 100 can include a first wing deck securing mechanism 150 for securing the first wing deck to the main deck 110 when in the raised configuration. In the aspect depicted in FIG. 1B, the first wing deck securing mechanism 150 can include a channel 154 for engaging a securing member on the first wing deck 120, where, as the first wing deck 120 shifts to the raised configuration, the securing member on the first wing deck 120 can insert into the channel 154 and can engage a locking mechanism, e.g., a notch or hook, securing the first wing deck 120 to the first wing deck securing mechanism 150. A lever 152 can be utilized to release, e.g., manually release, the first wing deck 120 from the first wing deck securing mechanism 150, e.g., in order to return the first wing deck 120 to the lowered configuration. It should be understood that the first wing deck securing mechanism 150 is just one example mechanism for securing the first wing deck 120 in the raised configuration, and that other securing mechanisms are also contemplated for use with the mowers disclosed herein.

Figure 3C:
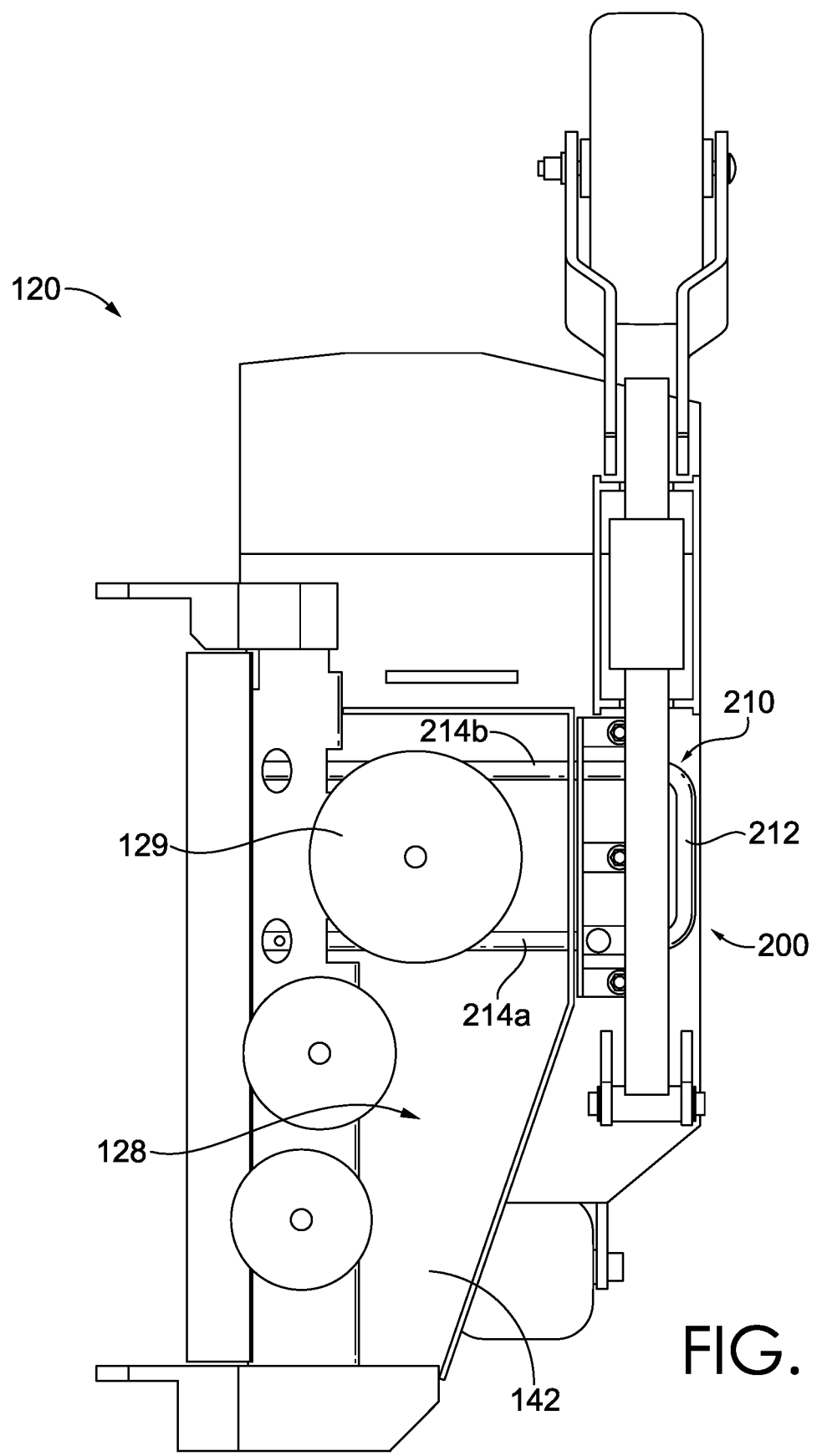
FIG. 3C depicts a top view of the wing deck of FIG. 3A, in accordance with aspects hereof.

As discussed above, in aspects, the mowers disclosed herein can include a manual lifting mechanism for shifting a wing deck between a lowered configuration and a raised configuration. For instance, a manual lifting mechanism 200 can be seen associated with the first wing deck 120 of the mower 100 depicted in FIG. 1B. FIGS. 3A-3C depict one example manual lifting mechanism, e.g., the manual lifting mechanism 200, coupled to the first wing deck 120. For clarity, in FIGS. 3A-3C, the first wing deck 120 and the manual lifting mechanism 200 are depicted in the absence of the remaining portions of the mower 100. Further, in the aspect depicted in FIGS. 3A-3C a cover and other portions of the first wing deck 120 have been removed to better illustrate portions of the manual lifting mechanism 200.

FIGS. 3A and 3C depict the manual lifting mechanism 200 in a retracted position, while FIG. 3B depicts the manual lifting mechanism 200 in an extended position. In such aspects, a shifting member 210 can be coupled to the first wing deck 120, e.g., slidably coupled to the first wing deck 120, and can move relative to the first wing deck 120 between the retracted position of FIGS. 3A and 3C and the extended position in FIG. 3B. In the extended position, an operator can manually engage a handle 212 of the shifting member 210 to raise the first wing deck 120 from the lowered configuration to the raised configuration. The handle 212, in an example, is a distal portion of the shifting member 210. The handle 212 may be a discrete structure or a portion (e.g., a distal end portion) of the shifting member 210, in an example.

As discussed above, in aspects, when the manual lifting mechanism 200 is in the extended position, the total force required to manually shift the first wing deck 120 from the lowered configuration to the raised configuration is reduced compared to manually shifting the first wing deck 120 from the lowered configuration to the raised configuration when the manual lifting mechanism 200 is in the retracted configuration. In aspects as discussed further below, in operation, the shifting member 210 can function as a lever with the shafts 214a and/or 214b that can engage a lifting engagement member 220 coupled to the first wing deck 120. In such aspects, when the shifting member 210 is in the extended position, less force is required to lift the first wing deck 120 from the lowered configuration to the raised configuration. In one aspect, the force required to use the manual lifting mechanism 200 in the extended position for a single operator to manually shift the first wing deck 120 from the lowered configuration to the raised configuration is about 25 Newtons or less. In the same or alternative aspects, the force required to use the manual lifting mechanism 200 in the extended position for a single operator to manually shift the first wing deck 120 from the lowered configuration to the raised configuration is roughly equivalent to or less than manually lifting an object of about 30 pounds to about 80 pounds, about 40 pounds to about 70 pounds, or about 45 pounds to about 65 pounds, or less than about 70 pounds, or less than about 60 pounds.

In various aspects, when in the extended position, the handle 212 of the shifting member 210 can be positioned away from the first wing deck second side 126 by a distance d of about 3 inches to about 24 inches, about 4 inches to about 20 inches, or about 5 inches or more, or about 7 inches or more.

As can be best seen in the aspects depicted in FIGS. 3A and 3B, the shafts 214a and 214b of the shifting member 210 extend through apertures 222 and 224, respectively, in the lifting engagement member 220. In aspects, as discussed above, the lifting engagement member 220 can be coupled to the first wing deck 120 so that a force applied to the shifting member 210 and associated shafts 214a and 214b is transferred to the lifting engagement member 220 and to the first wing deck 120. In such aspects, this transferred force can facilitate the lifting of the first wing deck 120 up and into the raised configuration, and/or can facilitate the shifting the first wing deck 120 from the raised configuration to the lowered configuration.

In various aspects, when the shifting member 210 shifts from the extended position to the retracted position, the shafts 214a and 214b extend into a pulley chamber 128 of the first wing deck 120. In various aspects, by having a portion of the shifting member 210, e.g., the shafts 214a and 214b, extend into the pulley chamber 128 when not in use aids in providing a compact manual lifting mechanism 200 that is at least partly housed in the first wing deck 120.

In various aspects, the pulley chamber 128 of the first wing deck 120 can include one or more pulleys, such as the pulley 129 that can be operatively coupled to a first wing deck blade of the first wing deck 120. The pulley chamber 128 may, alternatively or additionally, include one or more direct-drive mechanisms, such as an electric motor. In aspects, the first wing deck blade of the first wing deck 120 can be positioned in a cutting chamber 140 positioned underneath the pulley chamber 128. In aspects, the cutting chamber 140 can include a cutting chamber top plate 142 that may form a floor or bottom of the pulley chamber 128. In such aspects, when in the retracted position, at least a portion of the shifting member 210, e.g., at least a portion of the shafts 214a and 214b, and the pulley 129 can be positioned on or to one side, e.g., a second side 143a, of the cutting chamber top plate 142. In such an aspect, when in the retracted position, at least a portion of the shifting member 210 and/or the pulley 129 can be present in the pulley chamber 128, while positioned on or to one side, e.g., the second side 143a, of the cutting chamber top plate 142. In various aspects, the first wing deck blade can be positioned on or to an opposing side, such as a first side 143b, of the cutting chamber top plate 142, e.g., in the cutting chamber 140. The first side 143b and the second side 143a of the cutting chamber top plate 142 can best be seen in the aspect depicted in FIG. 5A.

It should be understood that alternate positions of the shifting member are also contemplated for use in the manual lifting mechanisms and mowers disclosed herein. For instance, in one aspect, the shifting member can be positioned in a dedicated chamber that is distinct from a pulley chamber or a cutting chamber. In another alternate aspect, the shifting member can remain positioned on top of a wing deck cover 125 or on top of the first wing deck 120 when in a retracted position.

FIG. 4 depicts an isolated view of the shifting member 210 discussed above with reference to FIGS. 3A-3C. It should be understood that the shifting member 210 depicted in FIG. 4 is just one example of a shifting member, and that other shifting member configurations are also contemplated for use in the lifting mechanisms and mowers described herein, such as the alternative shifting members discussed below with reference to FIGS. 6A-6C.

As can be seen in the aspect depicted in FIG. 4 and discussed above, the shifting member 210 can include a handle 212 and shafts 214a and 214b extending out from the handle 212. In the aspect depicted in FIG. 4, the handle 212 and the shafts 214a and 214b are depicted as being integral with one another; however, it is understood that one or more shafts can be coupled to a handle in one aspect of the shifting member 210.

FIGS. 5A-5C depict a side view of the manual lifting mechanism 200 engaging the first wing deck 120, with portions of the first wing deck 120 removed. FIG. 5A depicts the shifting member 210 in the retracted position, while FIGS. 5B and 5C depict the shifting member 210 in the extended position.

As discussed above, in aspects, the manual lifting mechanism 200, e.g., the shifting member 210, is coupled to the first wing deck 120. Further as discussed above in various aspects, the shifting member 210 may shift or slide from a retracted position, such as that depicted in FIG. 5A, to an extended position, such as that depicted in FIG. 5B. In such aspects, at least a portion of the shifting member 210 may slide or shift within a portion of a lifting engagement member. For example, as can be seen in the aspects depicted in FIGS. 5A and 5B, when the shifting member 210 shifts from the retracted position in FIG. 5A to the extended position in FIG. 5B, at least the shaft 214a slides or shifts through an aperture 226 in a first portion 223 of the lifting engagement member 220, and/or slides or shifts through an aperture 222 in a second portion 221 of the lifting engagement member 220. In various aspects not depicted in FIGS. 5A and 5B, the shaft 214b can slide or shift through an aperture in the first portion 223 and second portion 221 of the lifting engagement member 220 instead of, or in addition to, the shaft 214a sliding or shifting through the apertures 226 and 222.

As discussed above, when the shifting member 210 is in the extended position, the shaft 214a remain positioned within the apertures 226 and 222 of the lifting engagement member 220 so that a manual-based force applied to the handle 212 transfers to the first wing deck 120, via the lifting engagement member 220, to facilitate the shifting of the first wing deck 120 between the lowered configuration and the raised configuration. Further, as discussed above, when the handle 212 and/or the shifting member 210 is in the extended position a force required to lift the first wing deck 120 is reduced compared to when the handle 212 and/or the shifting member 210 is in the retracted position. In such aspects, the handle 212 and/or the shifting member 210 can function as a lever against the lifting engagement member 220 to facilitate the movement of the first wing deck 120 between the lowered configuration and the raised configuration.

In various aspects, the manual lifting mechanism 200 can be configured to lock or be secured in one or more of the extended position or the retracted position. For instance, as can be seen in FIGS. 5A and 5B, a locking mechanism 230 is coupled to the first wing deck 120 and can be configured to secure the shifting member 210 in the extended and/or the retracted position. In aspects, the locking mechanism 230 can be coupled to the first wing deck 120 directly or indirectly using any convenient coupling mechanism. As can be seen in the aspect depicted in FIG. 5A, the locking mechanism 230 can be coupled to the first wing deck 120 indirectly, e.g., by the locking mechanism 230 being coupled to the lifting engagement member 220, which is in turn coupled to the first wing deck 120, via the cutting chamber top plate 142 of a cutting chamber.

In various aspects, the shifting member 210 and the locking mechanism 230 are cooperatively adapted to secure the shifting member 210 in the retracted position and/or the extended position. For instance, in the aspect depicted in FIG. 5A, the locking mechanism 230 can include a locking pin 232 that engages a second locking recess 216 in the shaft 214a of the shifting member 210, when in a retracted position. In such aspects, the locking mechanism 230 can include a biasing element, e.g., a spring, which facilitates biasing the locking pin 232 towards the shifting member 210 and/or the shaft 214a.

In the aspect depicted in FIG. 5B, the handle 212 has shifted from the retracted position to the extended position. As can be seen in the aspect depicted in FIG. 5B, when in the extended position, the locking pin 232 of the locking mechanism 230 can engage a first locking recess 218 in the shaft 214a of the shifting member 210.

In various aspects, the locking pin 232 can be released from the first locking recess 218 and/or the second locking recess 216 by manually lifting up on the locking pin 232 and/or the locking mechanism 230.

It should be understood that the locking mechanism 230 depicted in FIGS. 5A and 5B is but one example locking mechanism 230 for securing the shifting member 210 in a retracted and/or extended position. For instance, in alternative aspects, the shifting member 210 can include appropriately-shaped notches for engaging the lifting engagement member 220 in the absence of a spring-loaded or biased locking pin.

In various aspects, it may be desirable to ensure that when shifting or sliding the shifting member 210 from the retracted position to the extended position the shifting member 210 does not entirely disengage or entirely exit the lifting engagement member 220 and/or the first wing deck 120. As can be seen in the aspect depicted in FIG. 5C, the shifting member 210 can include a positive stop member 219 that can engage with the lifting engagement member 220 to prevent the shifting member 210 from entirely disengaging or entirely exiting the lifting engagement member 220 and/or the first wing deck 120. In such aspects, the positive stop member 219 can be comprised of a bolt or screw that extends out from one or more of the shafts 214a or 214b of the shifting member 210. In various aspects, the positive stop member 219 can engage with the first portion 223 of the lifting engagement member 220 thereby preventing the shifting member from entirely exiting the lifting engagement member 220 and/or the first wing deck 120. In the aspect depicted in FIG. 4, the positive stop member 219 is positioned on the shaft 214b. In an alternate aspect, the positive stop member 219 can be placed on the shaft 214a and/or both of the shafts 214a and 214b can include positive stop members.

As discussed above, the shifting member 210 is just one example of the shifting member contemplated for use in the manual lifting mechanisms and mowers disclosed herein. For instance, as discussed above and as can be seen in FIG. 4, the first locking recess 218 and the second locking recess 216 of the shifting member 210 are positioned on the shaft 214a. In alternative aspects, one or more of the first locking recess 218 and the second locking recess 216 can be positioned on the shaft 214b. Further, the positive stop member 219 can be positioned on either or both of the shafts 214a and 214b.

Figure 6A:
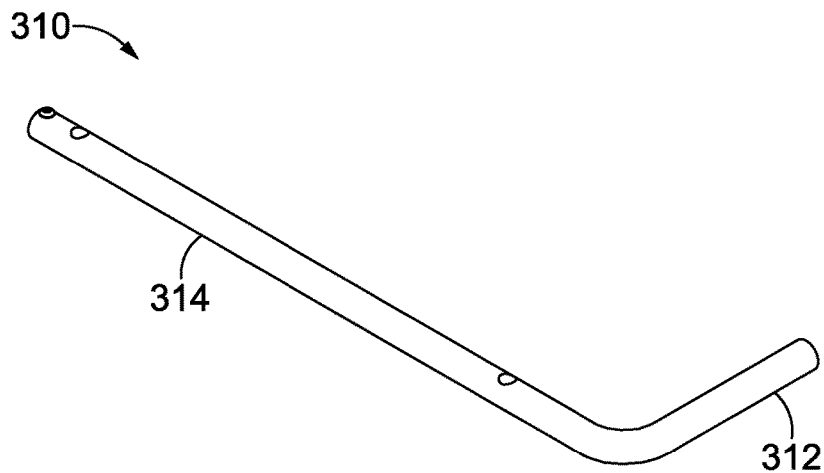
FIGS. 6A-6C depict top and side perspective views of various example shifting members, in accordance with aspects hereof.
Figure 6B:
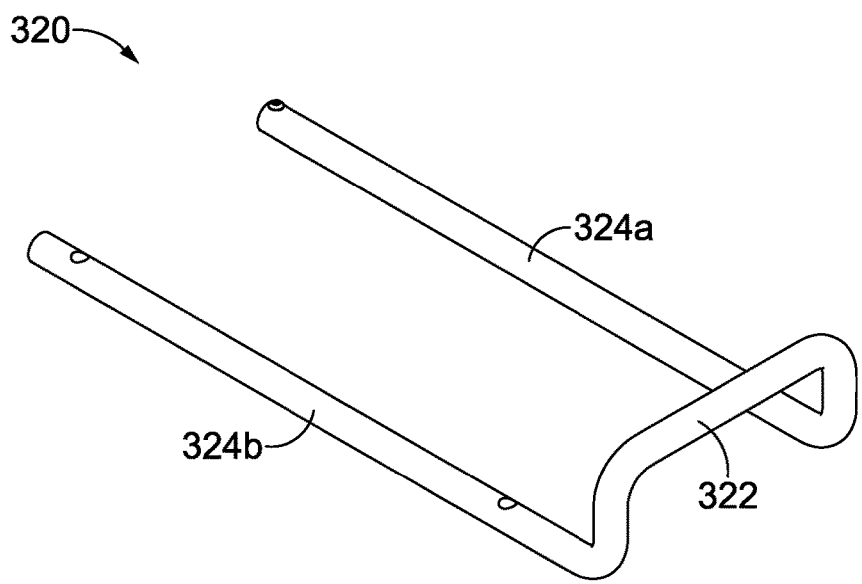
Figure 6C:
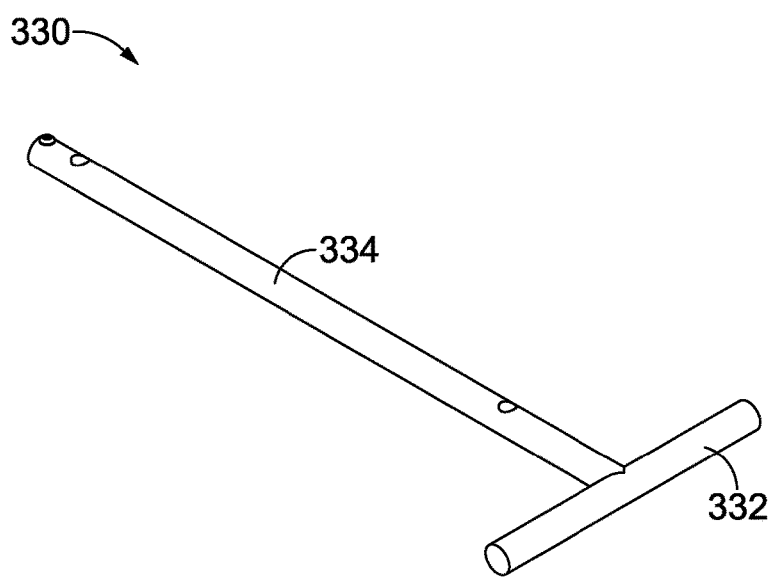

FIGS. 6A-6C depict other example shifting members for use in the manual lifting mechanisms and mowers disclosed herein. The example shifting member 310 depicted in FIG. 6A includes a single shaft 314 extending out from an end of the handle 312. In another example shifting member 320 depicted in FIG. 6B, the handle 322 can be curved in that at least a portion of the handle is offset from the plane along which the shafts 324a and 324b extend. In yet another example shifting member 330 depicted in FIG. 6C, a single shaft 334 can extend out from the middle of the handle 332, or extend out from a position that is between the ends of the handle 332.

Figure 7A:
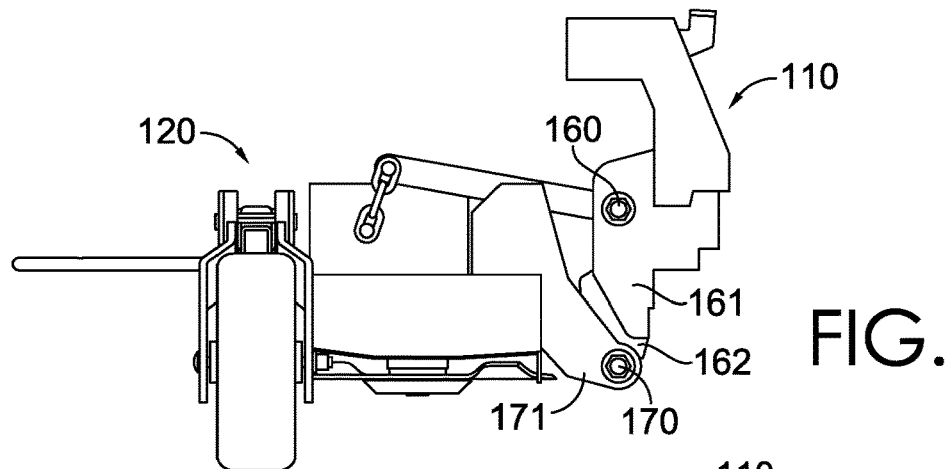
FIG. 7A depicts a side view of one wing deck in a lowered configuration, in accordance with aspects hereof.
Figure 7B:
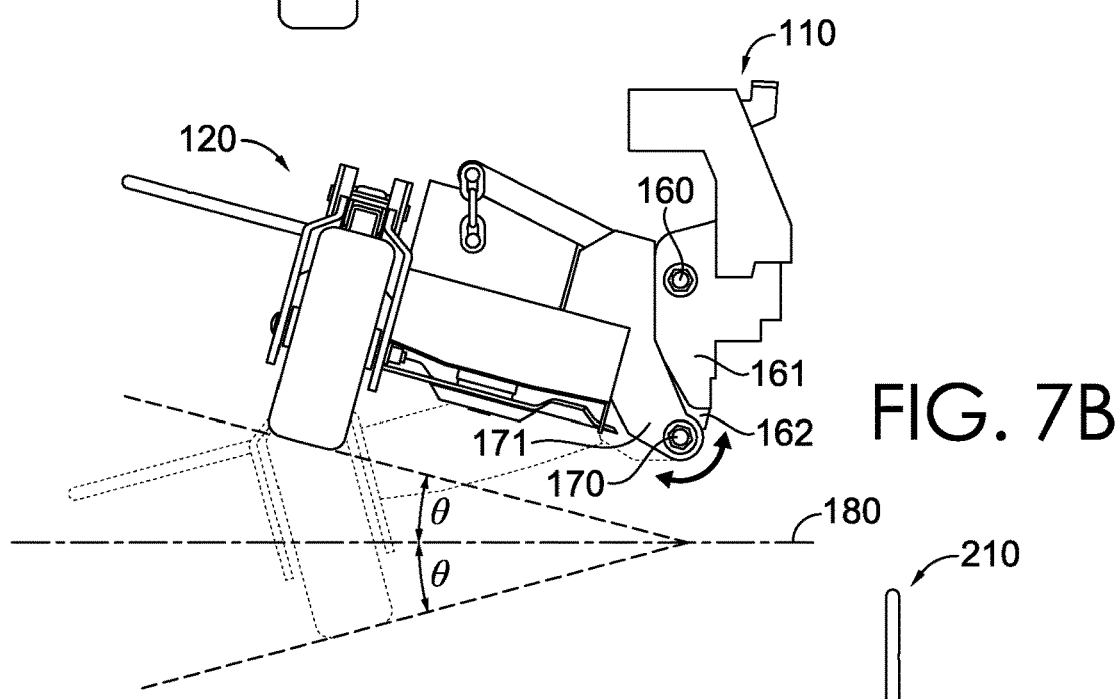
FIG. 7B depicts a side view of the wing deck of FIG. 7A shifted about a first pivot mechanism, in accordance with aspects hereof.
Figure 7C:
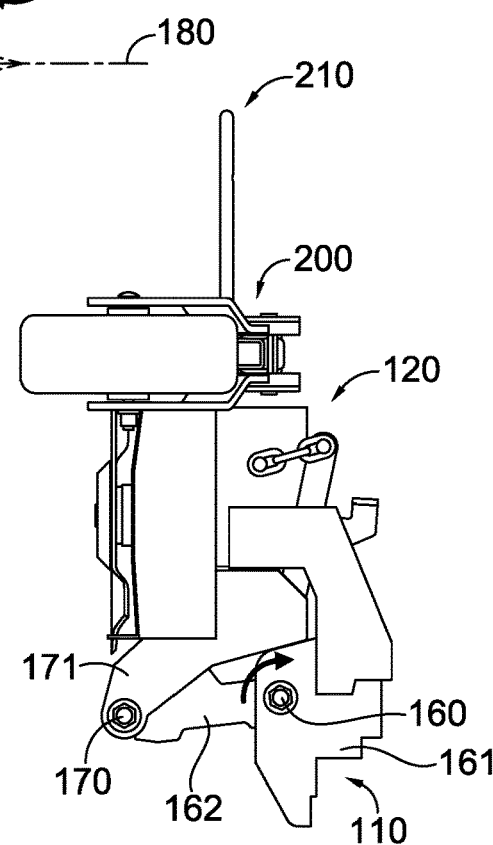
FIG. 7C depicts a side view of the wing deck of FIG. 7A shifted about a second pivot mechanism into a raised configuration, in accordance with aspects hereof.

As discussed above, in various aspects, the first wing deck 120 can be shiftably coupled to the main deck 110 such that the first wing deck 120 shifts from the lowered position depicted in FIGS. 1A and 2A to the raised positioned depicted in FIGS. 1B and 2B. FIGS. 7A-7C depict one aspect where the first wing deck 120 can shift from the lowered configuration to the raised configuration via two pivot mechanisms: a first pivot mechanism 160 and a second pivot mechanism 170.

FIG. 7A depicts the first wing deck 120 in a lowered configuration and a portion of the main deck 110 is also depicted. As can be seen in FIG. 7A, a portion of the first wing deck 120 is coupled to a second pivot mechanism 170, e.g., via the first wing deck coupling member 171. As also can be seen in the aspect depicted in FIG. 7A, a portion of the main deck 110 is coupled to the first pivot mechanism 160, e.g., via the main deck coupling member 161. The aspect in FIG. 7A also shows that a link 162 is coupled to both the first pivot mechanism 160 and the second pivot mechanism 170.

In various aspects, the second pivot mechanism 170 and the first pivot mechanism 160 are cooperatively adapted to shift the first wing deck 120 between the lowered configuration depicted in FIG. 7A and the raised configuration depicted in FIG. 7C. For instance, in aspects, when shifting the first wing deck 120 from the lowered configuration to the raised configuration, the first wing deck 120 will initially rotate up towards the main deck 110 about the second pivot mechanism 170 to a discrete position, and then at least the first wing deck coupling member 171 and the link 162 cooperatively continue to rotate the first wing deck 120 and the link 162 about the first pivot mechanism 160 into the raised configuration.

FIG. 7B depicts the first wing deck 120 rotating about the second pivot mechanism 170 from a substantially flat position, designated as the line 180, up towards the main deck 110 until the first wing deck coupling member 171 is contacting the main deck coupling member 161. In such aspects, the first wing deck 120 can rotate towards the main deck 110, via the second pivot mechanism 170, to about an angle Θ of about 2 degrees to about 45 degrees, or of about 5 degrees to about 40 degrees, or less than about 40 degrees. In the same or alternative aspects, the first wing deck 120 may rotate about the second pivot mechanism 170 towards the main deck 110 when the mower 100 is in use in order to accommodate uneven terrain. Further, the first wing deck 120 may also rotate away from the main deck when the mower is in use to about the angle θ mentioned above, and as depicted in FIG. 7B with the position of the first wing deck 120 depicted in phantom.

In aspects, when raising the first wing deck 120 to the raised configuration and when the first wing deck 120 has rotated via the second pivot mechanism 170 to an angle Θ, the link 162 and the first wing deck coupling member 171, and the first wing deck 120, rotate about the first pivot mechanism 160 to the raised configuration depicted in FIG. 7C. In operation, once the first wing deck 120 is in the raised configuration, the first wing deck 120 can be secured to the main deck 110 utilizing the first wing deck securing mechanism 150 discussed above with reference to FIG. 1B.

Figure 8A:
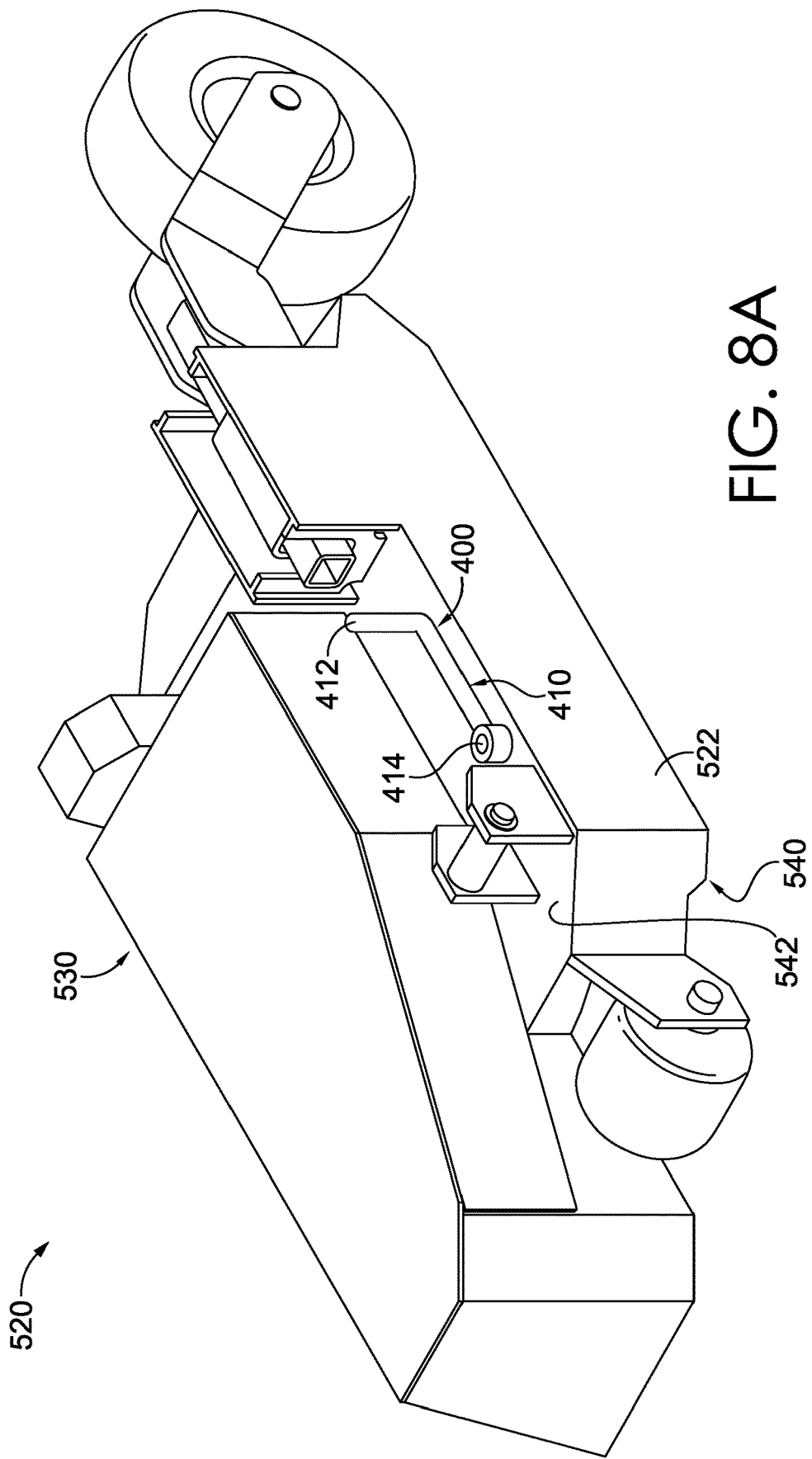
FIG. 8A depicts a top and side perspective view of a wing deck, with a manual lifting mechanism positioned on top of a cutting chamber and adjacent a pulley chamber, and with the manual lifting mechanism in a retracted position, in accordance with aspects hereof.
Figure 8B:
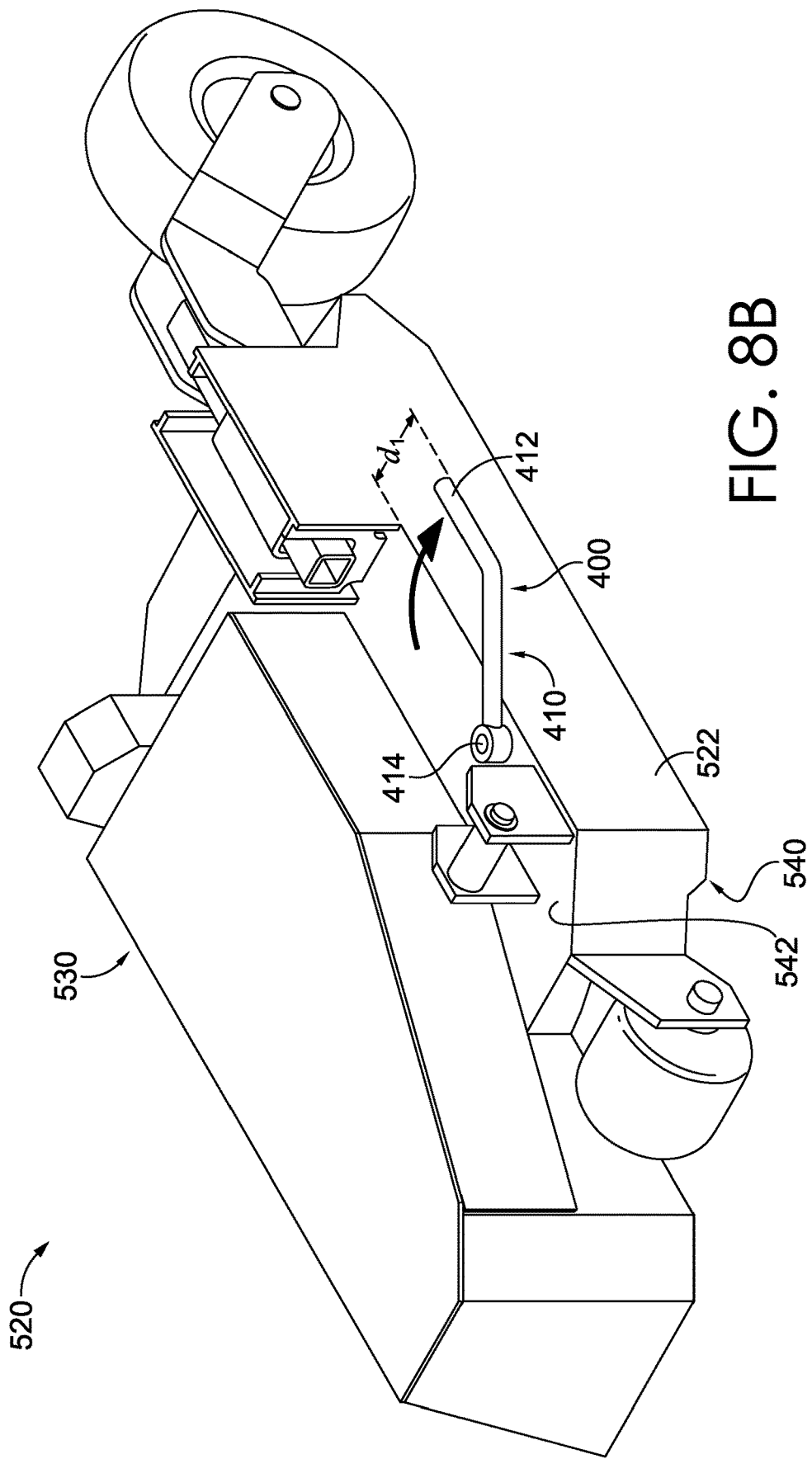
FIG. 8B depicts a top and side perspective view of the wing deck of FIG. 8A, with the manual lifting mechanism in an extended position, in accordance with aspects hereof.

FIGS. 8A and 8B depict another example manual lifting mechanism, e.g., the manual lifting mechanism 400, coupled to a wing deck 520. In aspects, the wing deck 520 can replace one or more of the wing decks 120 or 130 depicted in the mower 100 of FIGS. 1A-2B. For clarity, in FIGS. 8A and 8B, the wing deck 520 and the manual lifting mechanism 400 are depicted in the absence of remaining portions of a mower. Further, in the aspect depicted in FIGS. 8A and 8B, portions of the wing deck 520 have been removed to better illustrate portions of the manual lifting mechanism 400.

FIG. 8A depicts the manual lifting mechanism 400 in a retracted position and FIG. 8B depicts the manual lifting mechanism 400 in an extended position. In such aspects, a shifting member 410 can be coupled to the wing deck 520, e.g., rotatably coupled to the wing deck 520, and can move between the retracted position depicted in FIG. 8A and the extended position depicted in FIG. 8B. Similar to the manual lifting mechanism 200 discussed above, e.g., with reference to FIGS. 3A-3C, when the shifting member 410 is in the extended position, an operator can manually engage the shifting member 410, e.g., at a handle 412 of the shifting member 410, to raise the wing deck 520 from the lowered configuration, such as that depicted in FIGS. 1A and 2A, to the raised configuration, such as that depicted in FIGS. 1B and 2B. In aspects, the handle 412 may be a discrete structure or a portion of the shifting member 410. Further, it should be understood that the specific structure of the shifting member 410 depicted in FIGS. 8A and 8B is just one example of a shifting member that may shift and/or rotate between retracted and extended positions and be utilized to lift the wing deck 520 from a lowered to a raised configuration.

In various aspects, the manual lifting mechanism 400 can be coupled to the wing deck 520 in any convenient manner or location. In certain aspects, the manual lifting mechanism 400 can be coupled to an outer portion of the wing deck 520 to facilitate accessibility. In aspects, the manual lifting mechanism 400 or a portion thereof, can be coupled to a top portion of a cutting chamber 540 and/or adjacent a pulley chamber 530. In aspects, the manual lifting mechanism 400 or a portion thereof, e.g., the shifting member 410, can be coupled to a cutting chamber top plate 542 of the cutting chamber 540. In the aspect depicted in FIGS. 8A and 8B, the shifting member 410 of the manual lifting mechanism 400 can be coupled to the cutting chamber top plate 542 so that the shifting member 410 can shift and/or rotate about a pivot point 414 between the retracted position and the extended position. In aspects, the shifting member 410 of the manual lifting mechanism 400 can be rotatably coupled to the cutting chamber top plate 542, or other portion of the wing deck 520, in any convenient manner as long as the shifting member 410 can rotate or shift between the retracted and extended positions.

In various aspects, a locking mechanism may be coupled to the wing deck 520 that may at least temporarily secure the shifting member 410 in the extended position and/or in the retracted position. For instance, in various aspects, the manual lifting mechanism 400 may include a detent and/or one or more other fastening mechanisms for securing the shifting member 410 in the extended position and/or in the retracted position. In such aspects, the detent and/or fastening mechanisms can be any convenient detent and/or fastening mechanisms that are capable of at least temporarily securing the shifting member 410 in the extended position, e.g., when in use, and/or in the retracted position, e.g., when not in use. In certain aspects, the detent and/or one or more other fastening mechanisms can be positioned on the wing deck 520 adjacent the pivot point 414 or another portion of the wing deck 520.

Similar to the shifting member 210 of the manual lifting mechanism 200 discussed above with reference to at least to FIGS. 3A-3C, the shifting member 410 of the manual lifting mechanism 400, when in the extended position, can reduce a total force required to manually shift the wing deck 520 from the lowered configuration to the raised configuration compared to manually shifting the wing deck 520 from the lowered to the raised configuration when the manual lifting mechanism 400 is in the retracted position. In one aspect, the force required to use the manual lifting mechanism 400 in the extended position for a single operator to manually shift the wing deck 520 from the lowered configuration to the raised configuration is about 25 Newtons or less. In the same or alternative aspects, the force required to use the manual lifting mechanism 400 in the extended position for a single operator to manually shift the wing deck 520 from the lowered configuration to the raised configuration is roughly equivalent to or less than manually lifting an object of about 30 pounds to about 80 pounds, about 40 pounds to about 70 pounds, or about 45 pounds to about 65 pounds, or less than about 70 pounds, or less than about 60 pounds.

In the aspect depicted in FIG. 8B, at least a portion of the shifting member 410, e.g., the handle 412, can be positioned away from a side 522 of the wing deck 520 by a distance di of about 3 inches to about 24 inches, about 4 inches to about 20 inches, or about 5 inches or more, or about 7 inches or more.

Figure 9A:
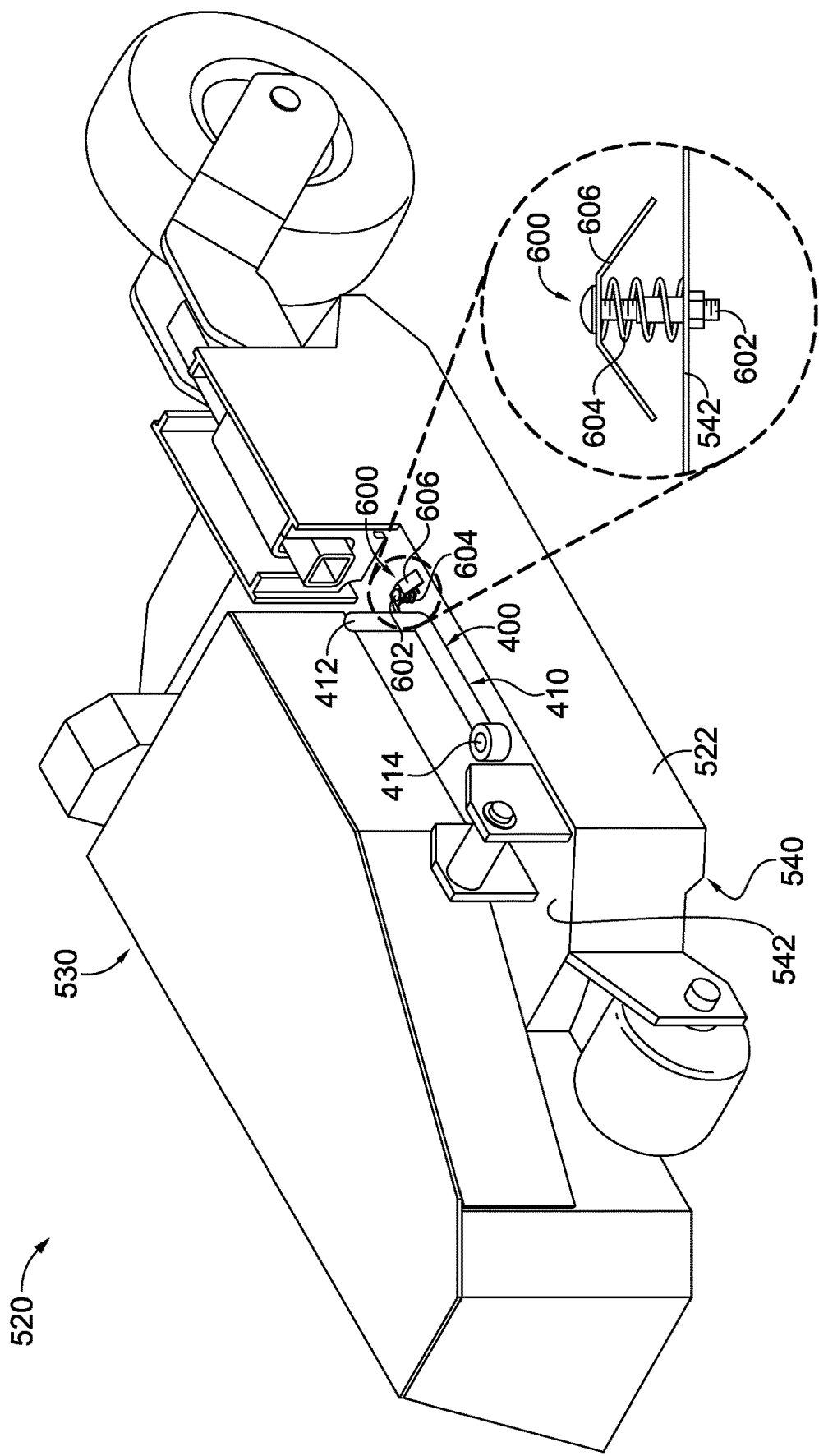
FIG. 9A depicts a top and side perspective view of the wing deck of FIG. 8A, with the manual lifting mechanism retained in the retracted position by a detent, in accordance with aspects hereof.
Figure 9B:
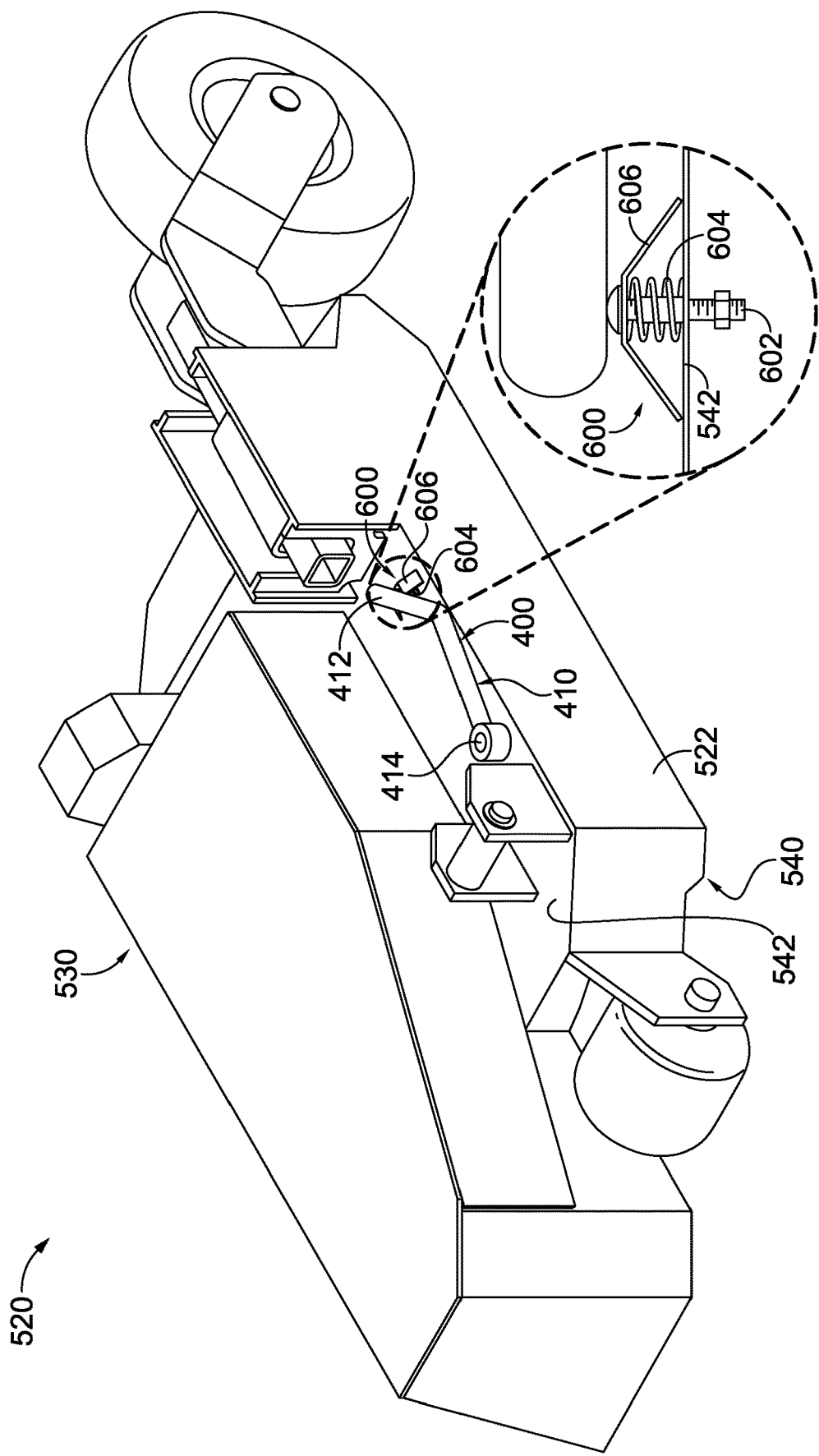
FIG. 9B depicts a top and side perspective view of the wing deck of FIG. 8A, with the manual lifting mechanism passing over and depressing the detent as it is moved from the retracted position to the extended position, in accordance with aspects hereof.
Figure 10A:
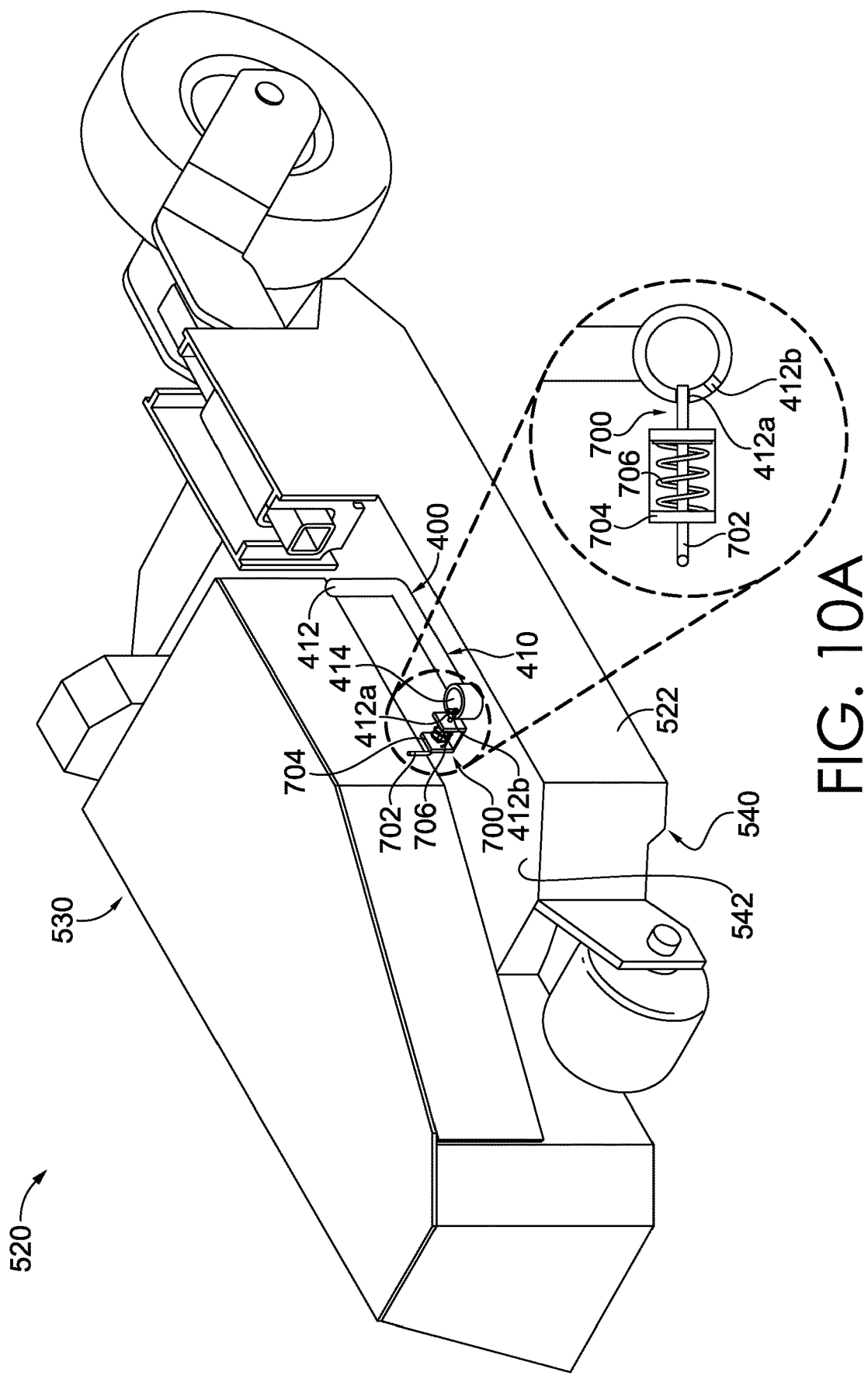
FIG. 10A depicts a top and side perspective view of the wing deck of FIG. 8A, with the manual lifting mechanism retained in the retracted position by a lock, in accordance with aspects hereof.
Figure 10B:
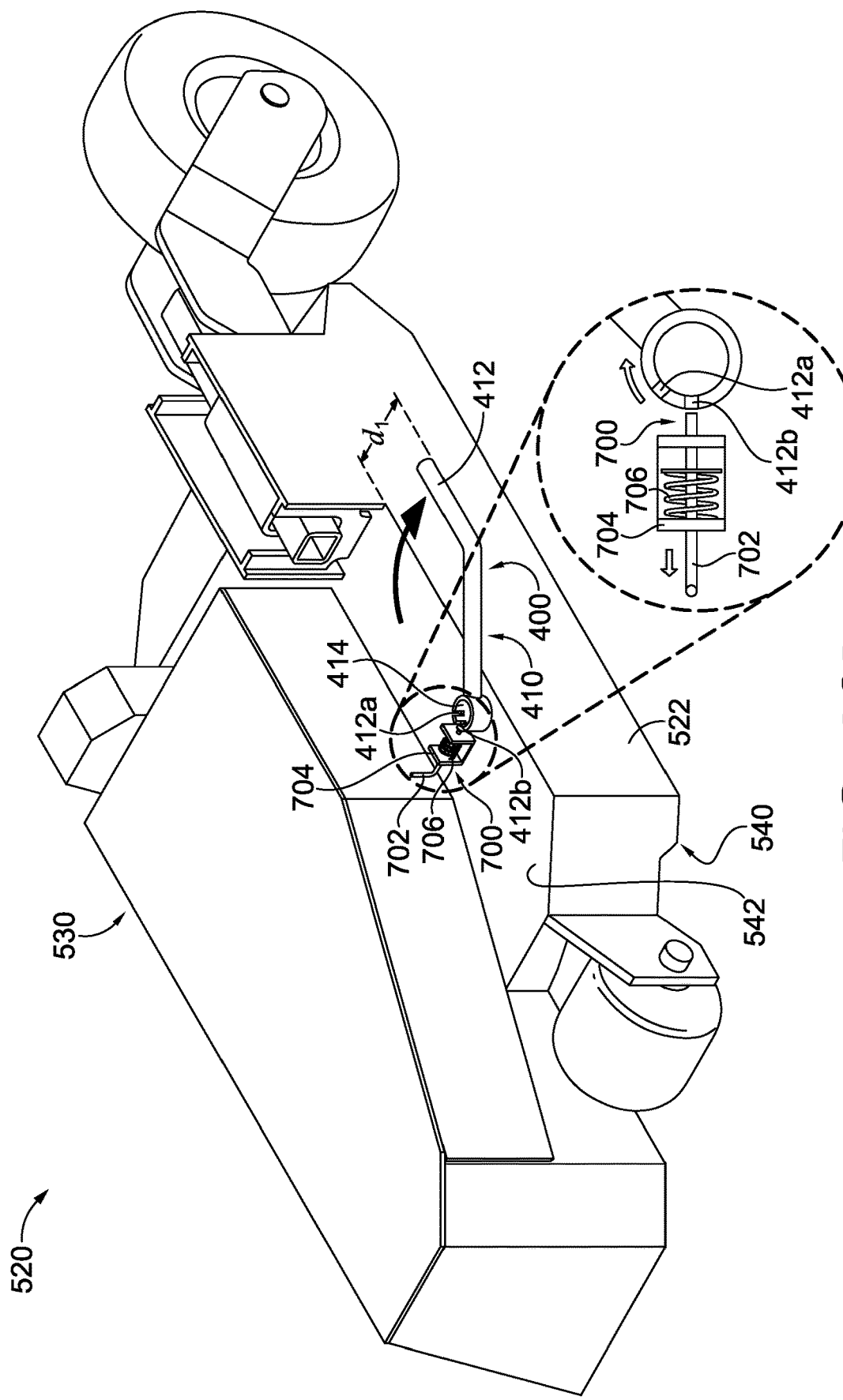
FIG. 10B depicts a top and side perspective view of the wing deck of FIG. 8A, with the manual lifting mechanism retained in the extended position by the lock, in accordance with aspects hereof.

Referring to the aspects shown in FIGS. 9A-10B, the handle 412 may be retained in one or more of the retracted position and the extended position by a detent 600, a lock 700, or other similar means. A detent 600 may be coupled to the cutting chamber 540, as shown in FIGS. 9A and 9B. The illustrated detent 600 includes a screw 602 extending through an aperture in the top plate 542 of the cutting chamber 540, a spring 604 positioned between a head of the screw 602 and the top plate 542, an angled plate 606 received on the screw 602 between the spring 604 and the head of the screw 602, and a nut threadably received on the screw 602 between a bottom side of the top plate 542 and the end of the screw 602. The angled plate 606 is configured to direct the handle 412 to pass over the detent 600 when the handle 412 is moved between the retracted position and the extended position. The detent may be positioned such that it engages the handle 412 when the handle is in the retracted position. As illustrated in FIG. 9A, the detent 600 creates a raised obstruction that retains the handle 412 in the retracted position. As illustrated in FIG. 9B, when the handle 412 is moved towards the extended position, the spring 604 is depressed and the detent 600 is press down so that the handle 412 may pass thereover. Likewise, the same occurs when the handle 412 is to be stowed and moved back to the retracted position.

Similarly, the handle 412 may be retained in the retracted position with the lock 700. Further, the lock 700 may also be configured to retain the handle 412 in the extended position, in accordance with some aspects. The handle 412 may include a first aperture 412a. In some aspects, the handle may also include a second aperture 412b. The first aperture 412a may be positioned such that it is aligned with the lock 700 when the handle 412 is in the retracted position. Likewise, the second aperture 412b may be positioned such that it is aligned with the lock 700 when the handle 412 is in the extended position.

The lock 700 may be coupled to the top plate 542 of the cutting chamber 540, in some aspects. The lock 700 may include a rod 702 that is received in either of the first aperture 412a or the second aperture 412b to retain the handle in a respective position. The rod 702 may extend through a "C" shaped bracket 704. A biasing member 706 (e.g., a spring) may be operatively coupled to the rod 702 and positioned within the bracket 704. The biasing member 706 may bias the rod 702 towards the handle 412. In the aspect illustrated in FIG. 10A, the rod 702 is received in the first aperture 412a and creates an obstruction to the handle 412 moving out of the retracted position. Similarly, in the aspect illustrated in FIG. 10B, the rod 702 is received in the second aperture 412b and creates an obstruction to the handle 412 moving out of the extended position.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

What is claimed:

1. A mower with one or more wing decks, comprising:
   at least one frame member;
   a main deck coupled to the at least one frame member, the main deck having a main deck first side and a main deck second side opposite the main deck first side, wherein the main deck comprises at least one main deck blade;
   a first wing deck, the first wing deck having a first wing deck first side and a first wing deck second side opposite the first wing deck first side, wherein the first wing deck comprises at least one first wing deck blade, wherein at least a portion of the first wing deck shifts between a lowered configuration, where the first wing deck and the main deck are positioned in a substantially planar orientation for engaging a mowing surface, and a raised configuration, where the first wing deck second side has shifted up so that the first wing deck extends between the first wing deck first side and the first wing deck second side in a direction that is transverse to a direction of extension between the main deck first side and the main deck second side the first wing deck having a top side opposite a bottom side, the at least one first wing deck blade positioned on the bottom side of the first wing deck;
   a pulley compartment is coupled to the top side of the first wing deck; and
   a manual lifting mechanism coupled to the first wing deck, the manual lifting mechanism comprising a handle portion and at least one shaft extending out from the handle portion, wherein the manual lifting mechanism is shiftable between a retracted position and an extended position, wherein, when in the extended position, at least part of the handle portion is positioned further away from the first wing deck second side than when in the retracted position, and wherein at least part of the one or more shafts is positioned inside the pulley compartment when in the retracted position.

2. The mower according to claim 1, wherein the first wing deck first side is coupled to the main deck first side, and wherein, when in the extended position, the at least part of the handle portion is positioned at least five inches away from the first wing deck second side.

3. The mower according to claim 1, wherein the first wing deck further comprises a cutting chamber, the cutting chamber having a cutting chamber top plate having a first side and an opposite second side, and wherein the at least one first wing deck blade is on the first side of the cutting chamber top plate and at least part of the manual lifting mechanism is on the second side of the cutting chamber top plate.

4. The mower according to claim 3, wherein the first wing deck further comprises at least one pulley operably coupled to the at least one first wing deck blade, and wherein the at least one pulley is on the second side of the cutting chamber top plate and housed inside the pulley compartment.

5. The mower according to claim 3, wherein the pulley compartment further comprises a cover, wherein at least part of the at least one shaft is positioned between the cutting chamber top plate and the cover, when the manual lifting mechanism is in the retracted position.

6. The mower according to claim 1, wherein a locking mechanism coupled to the first wing deck is adapted to secure the manual lifting mechanism in the extended position.

7. The mower according to claim 6, wherein the locking mechanism is further adapted to secure the manual lifting mechanism in the retracted position.

8. The mower according to claim 6, wherein the locking mechanism comprises a locking pin that is adapted to: i) engage a first locking recess in the at least one shaft when the manual lifting mechanism is in the extended position; and ii) to engage a second locking recess of the at least one shaft when the manual lifting mechanism is in the retracted position.

9. The mower according to claim 1, wherein at least part of the at least one shaft is positioned within at least one aperture of a lifting engagement member of the first wing deck, when the manual lifting mechanism is in both the retracted position and in the extended position.

10. The mower according to claim 9, wherein the at least one shaft comprises a positive stop member adjacent an end portion of the at least one shaft for engaging a portion of the lifting engagement member so that the end portion of the at least one shaft does not pass through the at least one aperture of the lifting engagement member when sliding the manual lifting mechanism away from the retracted position to the extended position.

11. The mower according to claim 1, further comprising:
a second wing deck, the second wing deck having a second wing deck first side and a second wing deck second side opposite the second wing deck first side, and wherein at least a portion of the second wing deck shifts between a second lowered configuration, where the second wing deck and the main deck are positioned in a substantially planar orientation for engaging the mowing surface, and a second raised configuration, where the second wing deck second side has shifted up so that the second wing deck extends between the second wing deck first side and the second wing deck second side in a direction that is transverse to the direction of extension between the main deck first side and the main deck second side, and wherein the first wing deck first side is coupled to the main deck first side and the second wing deck first side is coupled to the main deck second side; and
a second manual lifting mechanism coupled to the second wing deck.

12. The mower according to claim 11, wherein a maximum width $w_{max}$ of the mower is from about 60 inches to about 130 inches.

13. A stand-on mower with one or more wing decks, comprising:
at least one frame member;
an operator platform coupled to the at least one frame member;
a main deck coupled to the at least one frame member, the main deck having a main deck first side and a main deck second side opposite the main deck first side, wherein the main deck comprises at least one main deck blade;
a wing deck, the wing deck having a wing deck first side and a wing deck second side opposite the wing deck first side, wherein the wing deck comprises at least one wing deck blade, and wherein at least a portion of the wing deck shifts between a lowered configuration, where the wing deck and the main deck are positioned in a substantially planar orientation for engaging a mowing surface, and a raised configuration, where the wing deck second side has shifted up with respect to the main deck such that the wing deck is positioned transverse to the orientation of the main deck; and
a manual lifting mechanism coupled to the wing deck, the manual lifting mechanism comprising a handle portion and at least one shaft extending out from the handle portion, wherein the manual lifting mechanism is shiftable between a retracted position and an extended position, wherein, when in the retracted position, at least a portion of the at least one shaft is positioned within a pulley chamber of the wing deck, whereas when in the extended position, the handle portion is positioned further away from the wing deck second side than when in the retracted position.

14. The stand-on mower according to claim 13, wherein, when the manual lifting mechanism is in the extended position, the manual lifting mechanism reduces a force required to shift the wing deck from the lowered configuration to the raised configuration, compared to when the manual lifting mechanism is in the retracted position.

15. The stand-on mower according to claim 13, wherein, when in the retracted position, no portion of the handle extends beyond the wing deck second side.

16. The stand-on mower according to claim 13, wherein a locking mechanism coupled to the wing deck is adapted to secure the manual lifting mechanism in the extended position and in the retracted position.

17. The stand-on mower according to claim 13, wherein, when in the extended position, at least part of the handle portion is positioned at least five inches away from the wing deck second side.

18. The stand-on mower according to claim 13, wherein the at least one shaft comprises two shafts with each of the two shafts coupled to opposing ends of the handle portion.

19. The stand-on mower according to claim 18, wherein at least part of each of the two shafts are positioned within one or more apertures of a lifting engagement member of the wing deck, when in the retracted position and when in the extended position.

20. The stand-on mower according to claim 19, wherein at least one of the two shafts comprises a positive stop member for engaging a portion of the lifting engagement member so that the two shafts do not entirely exit the one or more apertures of the lifting engagement member when sliding the manual lifting mechanism away from the retracted position.

* * * * *